United States Patent [19]

Bodros et al.

[11] Patent Number: 4,542,498
[45] Date of Patent: Sep. 17, 1985

[54] HIGH BIT-RATE COUPLER BETWEEN A PCM CHANNEL MULTIPLEX AND A PACKET SWITCHING UNIT

[76] Inventors: Christian Y. Bodros, Squibernevez-Pédernec, 22540 Louargat; Joël V. Le Besco, Kerhars, Caouennec, 22300 Lannion; Yves R. Sichez, 14, rue de Saintonge, 29200 Brest, all of France

[21] Appl. No.: 491,656

[22] Filed: May 5, 1983

[30] Foreign Application Priority Data

May 10, 1982 [FR] France ............................ 82 08081

[51] Int. Cl.[4] .................. H04Q 11/04; H04J 3/16
[52] U.S. Cl. .................................. 370/60; 370/77; 370/79; 370/102
[58] Field of Search ............... 370/94, 60, 77, 102, 370/58, 99, 79

[56] References Cited

U.S. PATENT DOCUMENTS

| | | | |
|---|---|---|---|
| 4,392,222 | 7/1983 | Ando | 370/60 |
| 4,413,337 | 11/1983 | Dauphin et al. | 370/94 |
| 4,446,555 | 5/1984 | Devault et al. | 370/94 |
| 4,456,989 | 6/1984 | Johnson et al. | 370/94 |

*Primary Examiner*—Douglas W. Olms
*Assistant Examiner*—Curtis Kuntz
*Attorney, Agent, or Firm*—Lowe, King, Price & Becker

[57] ABSTRACT

A high bit-rate coupler is connected between a PCM channel bidirectional multiplex and a packet switching unit. Each channel carries packet words, such as octets, grouped in frames separated by flags 01111110. The coupler processes the first level related to the bits of the frame level of a packet exchange procedure. For each received frame, the coupler extracts the filling zeros from the received words between the flags, controls a frame checking sequence included at the end of each frame, counts the realigned words without filling zeros to be transmitted to the switching unit, and detects the flags and the start and end of the frame. At the transmitting end, the coupler inserts filling zeros in each transmitted frame when it detects six contiguous bits "1" in the words delivered from the switching unit, derives the frame checking sequence, transmits the dealigned words with the filling words, and produces flags. The memory capacity of the coupler is reduced to the characteristics or contexts for processing a word in each channel. Processing means common to the packet mode channels processes progressively the received words and the transmitted words without storing of entire frames. A storing means of the coupler has as many memory cells as channels for storing in each cell the contexts written after a word of the respective channel has been processed, and read for the next word in the respective channel to be processed after the other channels have been processed, at the rate of one word per channel.

11 Claims, 12 Drawing Figures

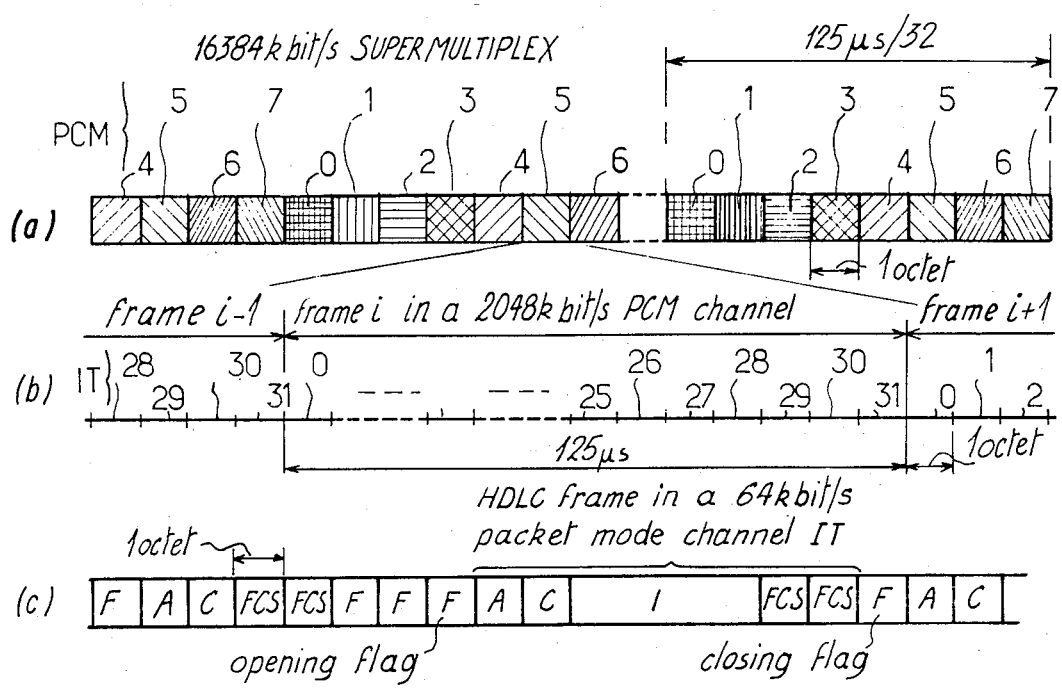
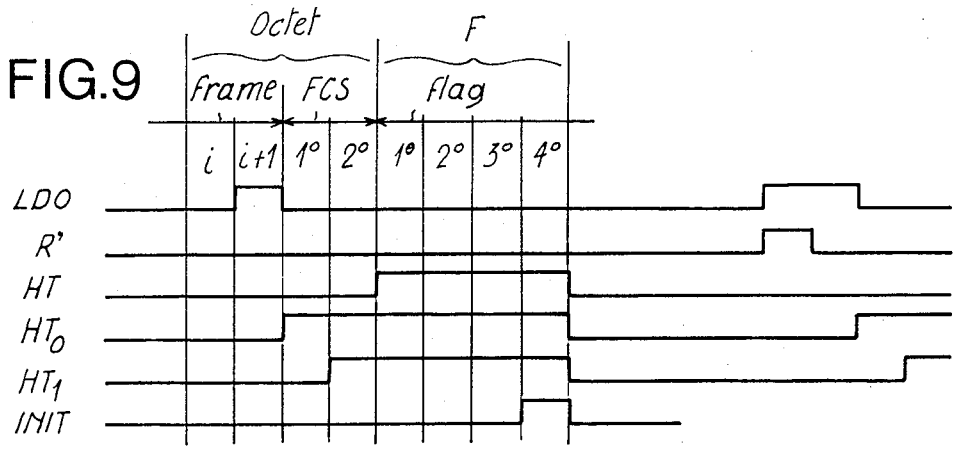

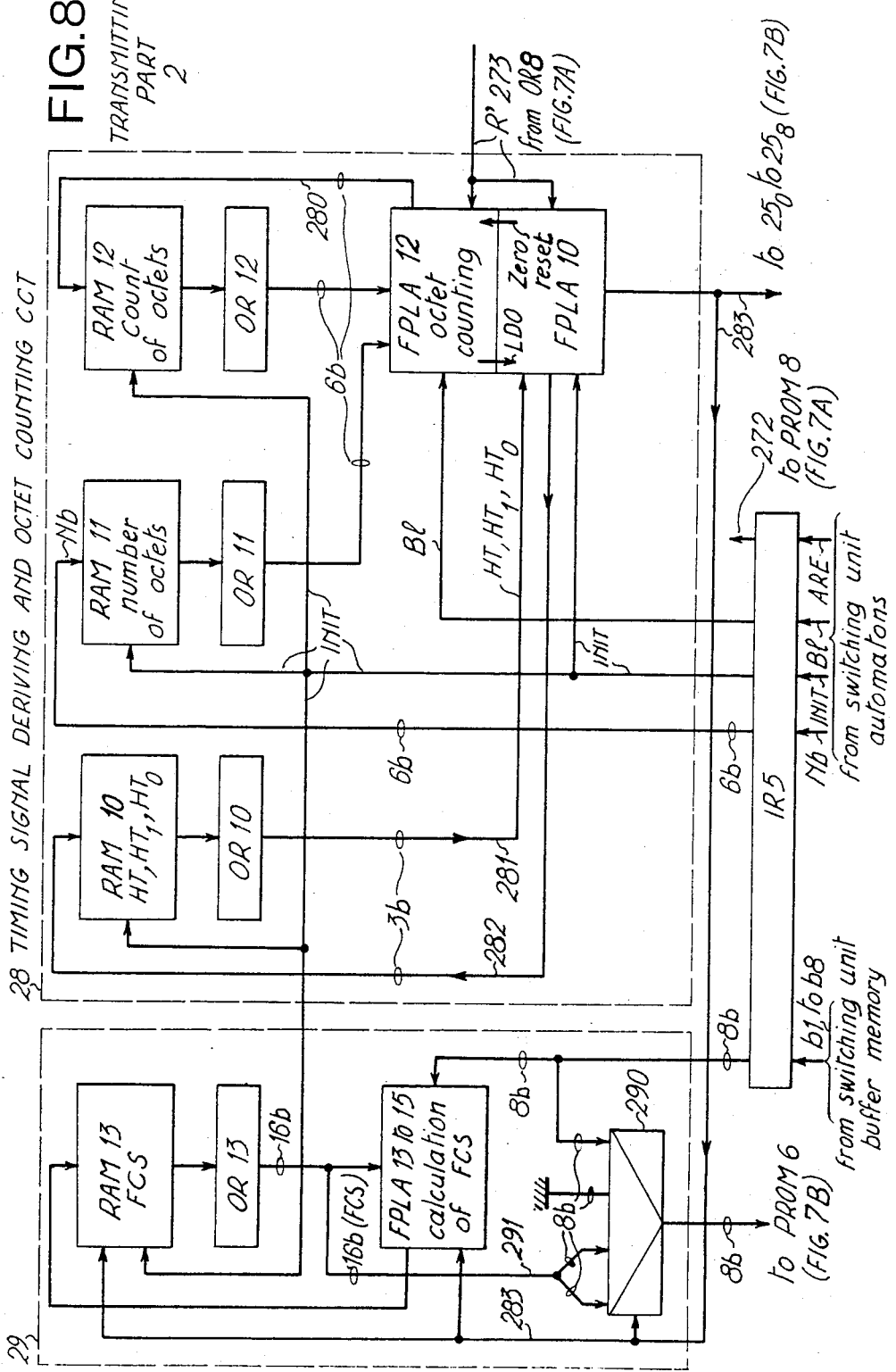

HIGH BIT-RATE COUPLER BETWEEN A PCM CHANNEL MULTIPLEX AND A PACKET SWITCHING UNIT

BACKGROUND OF THE INVENTION

1. Field of the Invention

This invention relates to a high bit-rate coupler between a PCM channel bidirectional multiplex and a packet switching unit. The PCM channels carry words, such as octets, having a predetermined number of bits that are multiplexed word by word. Generally speaking, certain PCM channels are in a circuit mode and others in a packet mode. The switching unit is a packet-circuit switching unit switching both circuit mode channels carrying, for example, sampled speech and packet mode channels each carrying frames of one or more logical channels.

2. Description of the Prior Art

As specified in international recommendations, the frames in each packet mode channel are separated from each other by flags that are words having a predetermined configuration, such as 01111110, and each frame in the multiplex contains a filling zero after five contiguous bits "1" such that the frame may be suitably detected.

A high bit-rate coupler is analogous to an input-output interface and processes the first level related to the frame level of a packet exchange procedure. At the receiving end, the coupler extracts the filling zeros from the frames received from the multiplex so that the switching unit can process the frames at the second level in the frame level; at the procedure packet level, the coupler controls a frame checking sequence, counts the octets and the filling zeros extracted from each frame and detects the flags and the start and end of each frame. Conversely, at the transmitting end, the coupler inserts filling zeros into the frames delivered from the switching unit, derives the frame checking sequence in each frame, transmits the octets supplied from the switching unit, produces the flags and aborts certain frames or disables certain channels.

To extract the filling zeros in order to restore the initial frames having a predetermined number of words, the number of zeros already extracted from the already-received words of the same frame must be known. Conversely, to insert the filling zeros into the initial frames, the number of zeros already inserted in the already-transmitted words of the same frame must be known.

In known high bit-rate couplers, the processing operation performed on the received words to extract zeros and on the transmitted words to insert zeros is carried out on a frame-by-frame basis. A necessary condition for the processing operations is that the whole received or transmitted frame must be stored, following detection of the opening or closing flags of the frame. After storing the frame, zero extraction or insertion takes place on a delayed basis. The major drawbacks of such conditions reside in the need for an extensive memory capacity compared to the number of multiplexed PCM channels and to the number of words contained in the frames. Additionally, given that frame reception or transmission is not synchronous, filling zero inserting and extracting means must be assigned to each PCM channel.

Other known "compound" couplers comprise elementary couplers each assigned to one PCM channel, thereby incurring a high number of elementary couplers and links between the elementary couplers and the switching unit.

OBJECTS OF THE INVENTION

The main object of this invention is to provide a high bit-rate coupler having reduced memory requirements, namely down to the characteristics for processing a word in each channel.

Another object of this invention is to provide a high bit-rate coupler having frame processing means common to all the packet mode channels.

SUMMARY OF THE INVENTION

According to the invention each receiving means for extracting filling zeros and transmitting means for inserting filling zeros of a high-bit rate coupler comprises logic means for processing only one channel word at a time to transmit at least a part of the channel word in the form of a word, and storage means having as many memory cells as channels for storing characteristics in each cell. The characteristics are written after a word in a channel has been processed and read for the next word in the same channel to be processed after the other channels have been processed, at the rate of one word per channel.

The logic processing means can comprise read only memories preferably programmable (PROM) or field logic arrays preferably programmable (FPLA).

A processing cycle for a word may be obtained as follows. During the time interval of a PCM channel word, the storage means supplies to the logic means characteristics known as contexts obtained when processing the previous word of the same channel. For PCM frames having a length of 125 $\mu$s including thirty-two octets each assigned to a 64 kbit/s channels, the word in a given channel and the context written in the storage means 125 $\mu$s earlier are processed by the logic means. The new context is stored in the storage means to process the next word of the same channel which takes place 125 $\mu$s after a similar processing operation has been performed on a word in each of the other PCM channels by the same logic means. The words are thus progressively processed as they are received and not, as in the prior art mentioned hereinabove, after reception of the entire frame. The coupler also differs from known "compound" couplers in which the multiplex is demultiplexed into a plurality of channels such that each of the demultiplexed channels can be processed by an elementary coupler.

According to a further feature of the invention, the receiving means of the coupler comprises logic means for counting the number of bits "1" at the end of each word in the received channels from said multiplex, means for storing said number of bits "1" per word in each of said received channels, logic means for detecting the filling zeros to be extracted from each word of each received channel from the multiplex in terms especially of the stored number of bits "1" for the previous word of the same channel, logic means for relegating the detected filling zeros at the end of a word, logic means for extracting said filling zeros detected in a word to replace said detected filling zeros at the start of a word by the last bits of the previous word, means for storing a word from each channel with said extracted filling zeros, logic means for counting the number of filling zeros (the counting means has a modulus equal to the predetermined number of bits in each channel) as the words in said channel are being received from said multiplex, means for storing said number of filling zeros for each channel, and logic realigning means to transmit to the switching unit a realigned word. The start of the realigned word includes bits from the end of a stored word with extracted filling zeros for each channel, and the end of the realigned word includes bits from the start of the next word of said channel having filling zeros at the end; where the number of said start bits of said next word is equal to the stored number of filling zeros of said channel after said word to be transmitted has been processed.

According to a further feature of the invention, the transmitting means of the coupler comprises logic means for inserting filling zeros in words delivered from said switching unit, logic means for counting the number of bits "1" at the end of each word transmitted from said filling zero inserting means, means for storing said number bits "1" for a word in each channel, logic means for counting the number of filling words to be inserted in a word delivered from said switching unit in terms especially of the stored number of bits "1" in the previous word of the same channel, logic means for forming a word with the start bits of said word with said filling zeros, logic means for forming a word with the end bits of said word with said filling zeros, means for storing the end bits of a word with the filling zeros for each channel, logic means for counting the number of inserted filling zeros (the counting means has a modulus equal to said predetermined number of bits in each channel) as the words in said channel are being transmitted to said multiplex in order to keep the shift between the word to be transmitted in the multiplex and the word delivered from said switching unit up to date, means for storing said filling zero number for each channel, and logic dealigning means to transmit in said multiplex a dealigned word including bits from the end of a stored previous word. The dealigned word has filling zeros for each channel and the bits from the start of the next word that are filling zeros of said channel, where the number of said end bits of the previous word is equal to the stored number of filling zeros of said channel after the said previous word has been processed.

BRIEF DESCRIPTION OF THE DRAWING

Other objects, features and advantages of the invention will be apparent from the following more particular description of preferred embodiments of the invention as illustrated in the accompanying drawings in which:

FIGS. 1A, 1B and 1C are time charts relating to the multiplexing of 2048 kbit/s multiplex channels into a 16,384 kbit/s supermultiplex, the multiplexing of 64 kbit/s switchable channels in a 2048 kbit/s channel, and the structure of a packet mode frame;

FIG. 8 is a detailed block diagram of a timing signal deriving and octet counting circuit for timing operations peculiar to unaligned octet transmission, and a frame checking sequence calculating circuit included in the transmitting part; and FIG. 9 is a time chart of the clock signals stored in the transmitting part.

DESCRIPTION OF THE PREFERRED EMBODIMENTS

The embodiment described hereinafter relates to a high bit-rate coupler implementing a high level data link control procedure (HDLC) as defined by the International Organization for Standardization (ISO). The principles and terminology of the HDLC procedure employed in the specification that follows comply with Recommendation X.25, Volume VIII.2, yellow book, Geneva 1976, modified in Geneva 1980 and published by the International Telegraph and Telephone Consultative Committee (C.C.I.T.T.).

The coupler constitutes an interface between a 16,384 kbit/s bidirectional supermultiplex and a packet-circuit switching unit that switches circuit mode channels and packet mode channels having a bit-rate of 64 kbit/s. The supermultiplex includes eight multiplexed PCM channels, PCM0 to PCM7, having a bit-rate of 2048 kbit/s as indicated in FIG. 1A. Each of channels PCM0 to PCM7, is obtained by multiplexing 32 64 kbit/s channels, as depicted in FIG. 1B. In the supermultiplex, during a time lapse $125/32 = 3.9$ $\mu s$, the eight channels PCM0 to PCM7 are multiplexed octet-by-octet. In the frame of a PCM channel lasting 125 $\mu s$, thirty-two elementary 64 kbit/s channels IT0 to IT31 are multiplexed octet-by-octet. The IT channels are intended to be switched two-by-two in the switching unit.

Figure 2:
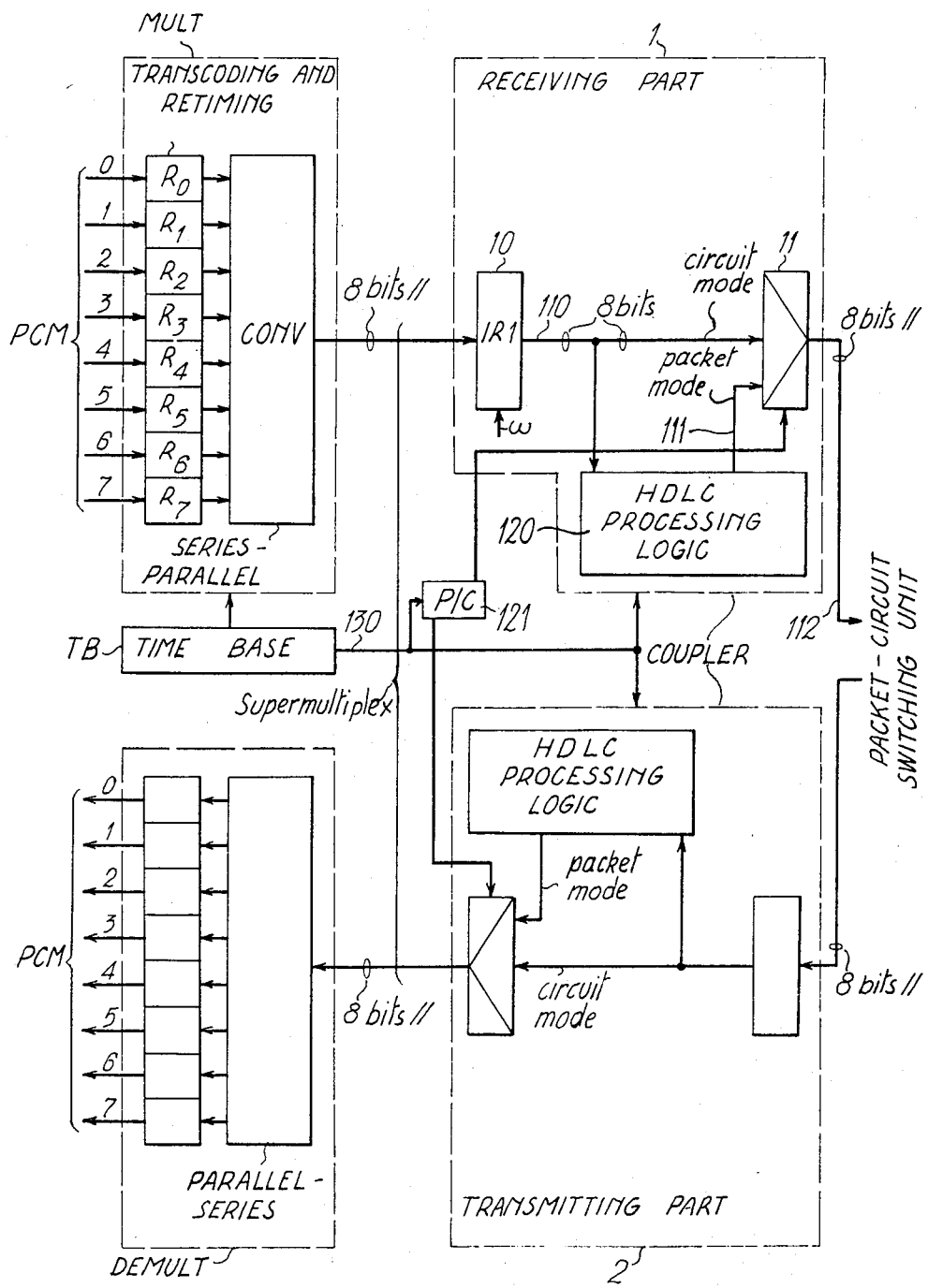
FIG. 2 is a schematic block diagram of the coupler between the supermultiplex and a packet-circuit switching unit.

In practice, the switching unit with the HDLC coupler constitutes a switching node, also called a tandem exchange, such as a sub-zone central office, or a local central office in a circuit mode and packet mode public switching network. For example, as illustrated in FIG. 2, the 16,384 kbit/s supermultiplex can be obtained at the tandem exchange level from a multiplexing operation on eight 2048 kbit/s channels PCM0 to PCM7, each of which is derived from another tandem exchange in the public switching network. An input register 10 of receiving part 1 of the HDLC coupler is conventionally preceded by a multiplexer MULT that multiplexes the eight incoming channels PCM0 to PCM7 and that conventionally comprises eight transcoding and retiming stages $R_0$ to $R_7$. Each stage $R_0$ to $R_7$ converts the line code of the incoming channel, e.g. HDB3 code, into the binary code, and retimes the incoming channels using a local time base TB. The outputs of stages $R_0$ to $R_7$ are connected to a series-to-parallel converter CONV. The output of converter CONV successively applies the multiplexed octets of the $32 \times 8 = 256$ 64 kbit/s channels IT via an 8-wire parallel bus to the input of the input buffer register 10, at the rate of one octet every $\omega = 125/(32 \times 8)$ $\mu s = 488$ ns. For the transmission, a demultiplexer DEMULT demultiplexes the octets of the supermultiplex leaving a transmitting part 2 of the HDLC coupler into the eight respective outgoing channels PCM0 to PCM7. The local time base TB is common to the coupler, the switching unit and the associated interfaces such as the multiplexer-demultiplexer MULT-DEMULT.

Each channel IT carries either circuit mode information corresponding, for example to sampling of a conventional telephone speech channel at 8 kHz frequency, or packet mode information corresponding to frames of one or more packets separated by flags. The invention herein is concerned solely with processing the packet mode channels IT at the frame level by including therein octet counting and parity checking. As can be seen in FIG. 2, the circuit mode octets IT pass directly through the receiving part 1, from the input register 10 (IR 1) to an output multiplexing circuit 11, via an 8-wire by-pass bus 110. Only the packet mode channel IT octets derived by the input register 10 are processed in a HDLC processing logic circuit 120 of the coupler. After processing, the processing logic circuit redelivers the packet mode octets to another input bus 111 of the output multiplexing circuit 11. The circuit-mode and packet mode 8 parallel-bit octets multiplexed by the circuit 11 are coupled to an 8-wire output bus 112 that is connected to an input of a buffer memory included in the packet-circuit switching unit. Selection of the octets is in response to the value of a P/C bit that indicates packet mode (P) or circuit mode (C) and is provided by RAM memory 121 addressed by the time base TB.

The coupler lends consideration only to the part commonly called "bit level" in the HDLC procedure which, in fact, is a part of the frame level having main characteristics described infra. On the other hand, the packet-circuit switching unit considers the upper level of the HDLC procedure frame level and the packet-level in keeping with Recommendation X.25 for frame management and packet switching.

In each 64 kbit/s channel IT are HDLC frames having a format as shown in FIG. 1C. Each HDLC frame includes at least four octets including an address octet A dependent on the transmitter and the receiver, a control octet C and two octets of a frame checking sequence (FCS). When the frame is an information frame, the frame contains information bits that make up a packet and are included in an information field I between the control field and the FCS field. Generally speaking, the information field length is limited, for instance, to $32 \times 8 = 256$ bits.

Between the frames is inserted an integral number of flags. Each flag includes a sequence containing one "0" followed by six contiguous "1" and then one "0", i.e., the octet 01111110. The same flag can be used as both a closing flag for one HDLC frame where the closing flag comes after the control field, and an opening flag for the next HDLC frame, where the opening flag precedes the address field of the next frame. To ensure that a flag sequence is not simulated in a frame, the transmitting part 2 of the HDLC coupler, which is partly equivalent to a data terminal equipment (DTE), inserts a "0" bit, termed a filling zero or filling bit, after all sequences of five contiguous "1" bits, including the FCS checking sequence elements. The transmitting part therefore "dealigns" the octets in the transmitted frame. Conversely, with packet-level processing in the switching unit in mind, the HDLC coupler receiving part 1 extracts and discards all filling zeros that have been inserted after five contiguous "1" bits in the frame, to realign the octets. The realignment adopts the frame opening flag as a reference point and is dependent on the number of filling zeros in the frame. The realignment is checked and, if necessary, is reinitiated upon reception of a flag. The same can be said for dealignment at the transmitting end, except for the initiation which then serves no useful purpose.

Additionally, prior to any frame processing at the upper level, a check must be made to determine that frame transmission across the network has not produced any transmission errors. This is verified by examining the contexts of the frame checking sequence FCS. If the FCS sequence is considered invalid, the switching unit ignores the frame received. The FCS sequence calculation is described in paragraph 2.2.7 of aforesaid Recommendation X.25. It will merely be mentioned that the FCS sequence is obtained from the generator polynomial $x^{16} + x^{12} + x^5 + 1$ and that in the receiving part the division by the generator polynomial of the content of the received and realigned frame will result in a remainder equal to 0001110100001111 in the absence of transmission errors.

For each 64 kbit/s channel IT, the HDLC coupler receiving part 1 performs the prime functions of flag detection and subsequently HDLC frame detection, filling zero extraction and octet realignment with a view of transmitting the detected flag and HDLC frame to the switching unit buffer memory. HDLC receiving part 1 also detects the upper level octets concerning the switching unit, and counts the octets to switch and read the frames appropriately. HDLC coupler receiving part 1 also performs other functions such as determining the validity of the checking sequence and alignment fault detection. The transmitting part 2 performs reciprocal operations for forming the HDLC frames based on packets transmitted by the switching unit. The latter operations particularly concern insertion of filling zeros in the frames, chopping data into octets, transmitting flags between the frames, deriving two frame checking sequence octets and derivation of 01111111 sequences permitting frame aborting in response to orders from the switching unit. According to the invention, all the above functions are performed for each octet in each 64 kbit/s packet mode channel multiplexed in the super-multiplex every 125 μs.

Figure 3:
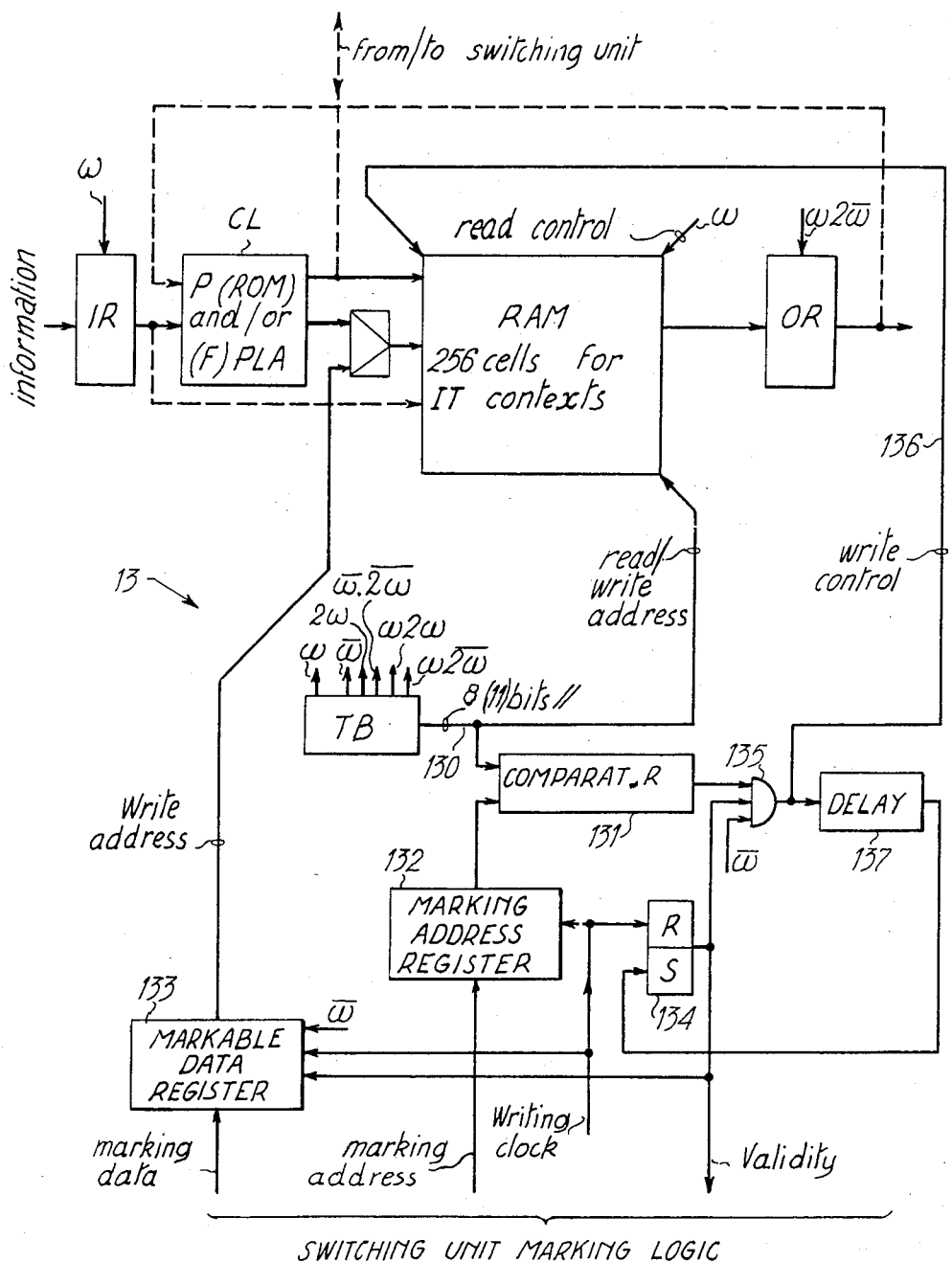
FIG. 3 is a schematic block diagram of the structure of the coupler with combinational logic units and RAM memories as well as the means for addressing the memories.

FIG. 3 is a schematic illustration of the ogranization of the receiving or transmitting part in the HDLC coupler. Each part contains a combinational logic unit CL chiefly comprised of read-only memories (P)ROM and-/or field programmable logic arrays (F)PLA, preferably programmable by the operator. Each receiving or transmitting part also contains a random access memory RAM. The RAM memories of the receiving and transmitting parts include 256 cells, each of which stores the contents of a 64 kbit/s channel IT. The contents of channel IT include characteristics to indicate how the channel IT octet is processed; the characteristics are modified and stored cyclically every 125 μs in memory RAM to assist in processing the next octet in the same channel IT. The new contents are stored at the end of octet processing, as performed by the combinational logic unit CL. Concurrently with the end of octet processing, the combinational logic unit CL of the receiving part delivers the suitably realigned packet octet sans the filling zeros to the switching unit buffer memory. Alternatively, the combinational logic unit CL of the transmitting part delivers a portion of the octet with filling zeros to the output demultiplexer DEMULT.

In FIG. 3 are schematically illustrated the addressing means 13 together with the input registers IR and the output registers OR associated with the various RAM memories. The addressing means 13 works on a time division basis over $32 \times 8 = 256$ successive periods of 488 ns to perform write-in and read-out operations. Indeed, the new contents of the same channel IT must be written after the old contents have been read to avoid erasing the old contents before the processing phase.

Figure 4:
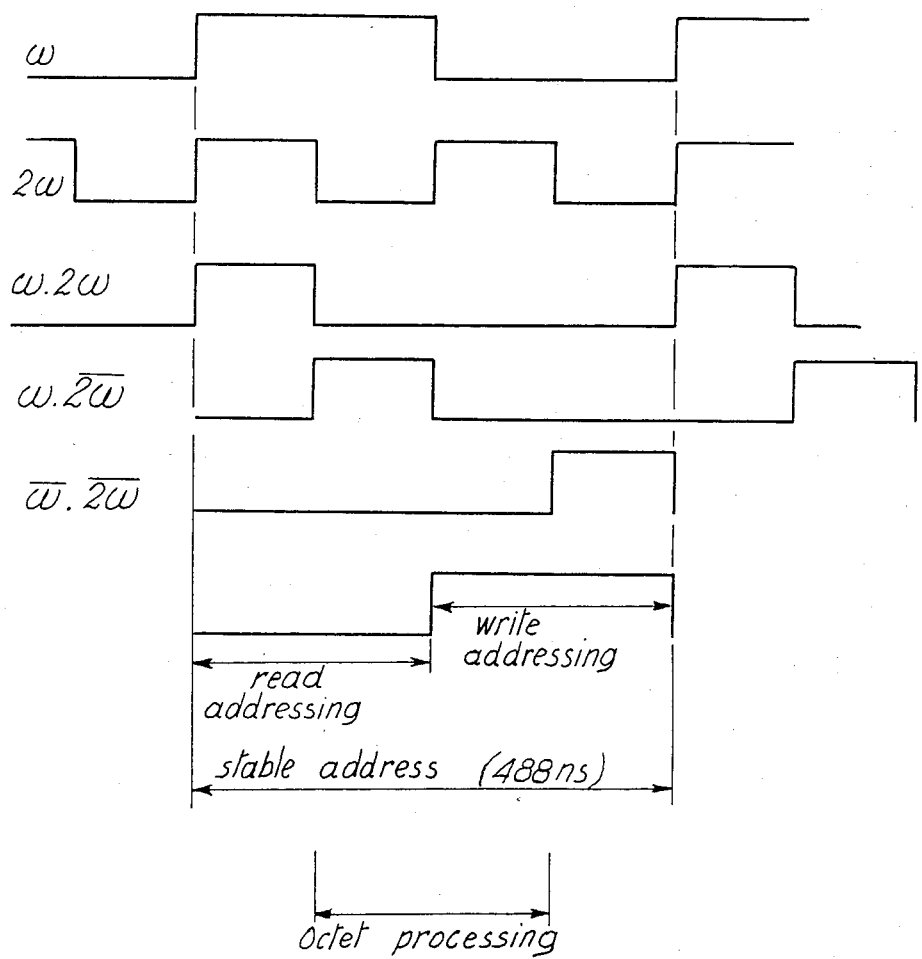
FIG. 4 is a time chart of signals for addressing the RAM memories.

Addressing the RAM memories is described in reference to the logic signals supplied by the time base TB, as illustrated in FIG. 4. The logic signals include a signal $\omega$ with a period of 488 ns, a complementary signal $\bar{\omega}$, a signal $2\omega$ with a period of $488/2 = 244$ ns and product signals $\omega \cdot \overline{2\omega}$, $\omega \cdot 2\omega$ and $\bar{\omega} \cdot 2\omega$.

The RAM memory reading and writing addresses have 8 bits for the 64 kbit/s elementary bit-rate, or 11 bits, should one wish to process lower bit-rate channels such as 8 kbit/s. Each address includes one 3-bit word representative of the 2048 kbit/s PCM channel number in the 8-channel supermultiplex PCM0 to PCM7 and one 5-bit word representative of the 64 kbit/s IT channel number in the PCM channel (there are 32 such channels numbered IT0 to IT31); where applicable, for a bit-rate lower than 8 kbit/s, each address includes one 3-bit word representative of the number of the octet to be processed in the channel IT. The addresses considered hereinafter are applicable only to channels that can be processed with a bit-rate of 64 kbit/s. The 8-bit address is supplied by an output bus 130 from the local time base TB and is fed to the RAM memory address input bus.

For the majority of parts in the contexts where outside initiation is not required, the contexts are self initiating and the signal $\bar{\omega}$ systematically controls writing in the RAM memory; this is particularly the case for counting filling zeros and counting octets in the coupler receiving part as will be seen later.

For a minority of parts in the contexts, outside initiation by a marking logic device of the switching unit is required; a logic comparator 131 is then provided as illustrated in FIG. 3. The 8-bit address in the bus 130 is applied to an input bus of the comparator 131. Another input of the comparator 131 receives, via a first marking register 132, a corresponding marking address provided by the switching unit synchronous marking logic unit at the packet level. Marking data to be stored in the RAM memories at the corresponding channel IT address are stored in a second register, referred to as the markable data register 133, under the control of a writing clock signal from the marking logic unit; the writing clock signal is also applied to the input R of a flip-flop RS 134. The output from the comparator 131, the output from the flip-flop 134 and the complementary signal $\bar{\omega}$ are applied to inputs of an AND gate 135 that supplies a write control signal via lead 136 to the memories RAM and to a delay circuit 137. Delay circuit 137 introduces a delay of a few tens of nanoseconds, time sufficient for the RAM memory write-in operation. The output of AND gate 135 is derived when the comparator 131 detects equality in the addresses supplied by the time base TB and the switching unit marking logic unit. The delay circuit 137 output is wired to input S of the flip-flop 134 to activate the flip-flop so the flip-flop feeds an enabling bit to the marking logic unit. The enabling bit in the "0" state indicates to the marking logic unit that a new context has been stored in the RAM memories. Were the comparator 131 not to detect equality, the context is unmodified; this corresponds in particular to initiation of the number of octets in a frame, as described later.

As regards processing an octet during the two central pulses of the signal $2\omega$ (FIG. 4), the contexts are initially read, on the one hand, by addressing the RAM memories during a read operation that occurs during the first half period of the signal $\omega$, whereupon the contexts are stored in the output registers OR. During the second quarter of the period of signal $\omega$, the output registers OR receiving the signal $2\omega$ supply the contexts which are to be processed at the same time that incoming information derived from the input registers IR is read and in response to the leading edge of the signal $\omega$. This processing operation continues until the third quarter of the signal $\omega$ during which the new contexts thus produced are written in the RAM memories at the same address that is supplied to the memories during the 488 ns defined by two "1" levels of the signals $\omega$ and $\bar{\omega}$, where the signal $\bar{\omega}$ applied to the gate 135 and the register 133 controls the write-in operation. For certain stored words, the writing is blocked; for instance, for reproducing the two frame checking sequence octets or for counting octets, as will be seen later. In the latter cases, the comparator 31 in FIG. 3 is not considered and the write-in operation is not subject to the comparison performed by the comparator.

For other RAM memories, an outside initiation must be provided; at the transmitting end, the number of octets in a frame is provided by the switching unit marking logic unit and must be stored for each frame to be transmitted. The writing address is delivered by the marking address register 132 when the gate 135 output is in the state "1". The validity bit is reset to zero after writing in the RAM memories.

Figure 5:
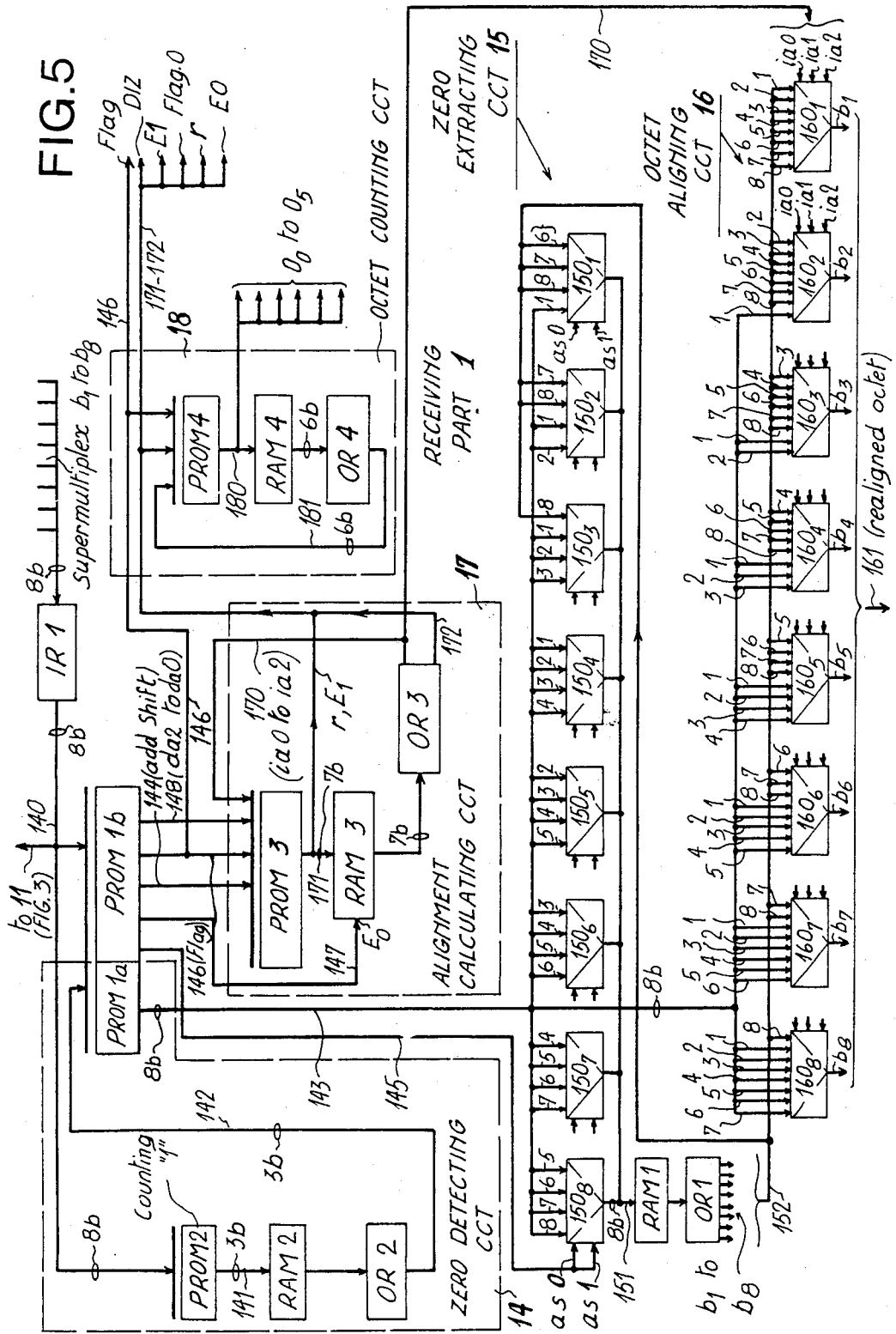
FIG. 5 is a detailed block diagram of the filling zero extracting means included in the coupler receiving part.

Referring now to FIG. 5 wherein are illustrated the means included in the receiving part 2 for deriving the realigned octets without the filling zeros. The prime functions fulfilled by the latter deriving means involve extracting zeros, detecting flags and correlatively, detecting frames of octets and counting octets. It is recalled that the control field processing (frame level management) and in particular the detection and the production of the send sequence numbers N(S) and the receiver sequence numbers N(R) together with the detection of service frames (so-called supervisory frames S and unnumbered frame U) are operations performed by an automaton at the frame level associated with the coupler and do not fall within the scope of the invention.

Additionally, the following convention is adopted as regards the order of transmission bits in an octet; the described convention is in keeping with paragraphs 2.2.8 and 6.1 of aforementioned Recommendation X.25. At the transmitting end, the binary elements are numbered $b_8$ to $b_1$; bit $b_1$ is the least significant bit ($2^0$) and is transmitted first; the bit $b_8$ is the most significant bit ($2^7$) and is transmitted last.

At the input for the receiving part 2, the octets with parallel bits are transmitted by the input register IR1, 10, FIG. 2, in response to register IR1 receiving the signal $\omega$ from the time base TB. 8-wire output bus 140 of register IR1 supplies the octets to the multiplexer 11 (FIG. 2) which also receives the outgoing octets from the receiving part via the bus 111, i.e., from a register 197 shown in FIG. 6 as described later. The bus 140 is also connected to a programmable memory which in practice comprises two programmable memories PROM 1a and PROM 1b. Each octet derived by the register IR1 is also transmitted to a programmable memory PROM2 included in a filling zero detecting circuit 14.

The memory PROM2 counts the bits "1" at the end of the received octet. The count of the latter bits "1" is a three-bit word, such as "010", when the octet bits $b_7$ and $b_8$ are in the state "1" and the octet bit $b_6$ is in state "0"; the value of the three-bit word is coupled via a 3-wire bus 141 to memory RAM2 where it is stored. The cell in the memory RAM2 corresponding to the channel IT of the octet being processed is read 125 $\mu$s later; a "1" count is thus selectively coupled from memory RAM2 via output register OR2 and 3-wire input bus 142 to the memory PROM 1a. The memory PROM 1a extracts the zeros from the next octet of the channel IT and arranges the octets at the end of the next octet in the positions corresponding to the two most significant bits $b_7$ and $b_8$. For instance, suppose that the received octet is "XXXXX011", where X indicates any bit value, and produces a "1" count equal to "010" at the end of the octet and that the next octet is "11101111". In the next octet, the bit $b_4$ comes after five "1s" and is a filling zero. The filling zero is therefore extracted and relegated to the most significant bit position $b_8$. The octet supplied to information output bus 143 by the memory PROM 1a is then equal to "11111110".

The PROM 1a and PROM 1b also deliver additional informations which contribute to processing the octet later on, such as the octet alignment. To achieve the alignment, the additional shift due to the extractable filling zeros inserted at the end of the octet must be known. The additional shift is indicated by a bit (add Shift) supplied to output bus 144 by the memory PROM 1b. The number of zeros to be extracted is indicated by two bits (as1) and (as0) supplied to two output wires 145 by the memory PROM 1b. If there is no zero to be extracted, the add Shift bit as well as the as1 and as0 bits are in the "0" state. In the opposite case, the add Shift bit is equal to "1" and the word consisting of bits as1, as0 is equal to "01" or "10" when one or two filling zeros are to be extracted. The case of bits (as1) (as0) being equal to "11" does not exist since there are never more than two filling zeros in a received octet.

The eight bits in the octet supplied by the memory PROM 1a are delivered via the bus 143 to a zero extracting circuit 15 that comprises eight multiplexers $150_1$ to $150_8$, each having four inputs. The most significant bits in the octet previously received are stored without any filling zeros in a memory RAM associated with an output register OR1. The previously received octet is taken into consideration for the extraction of the zeros and alignment of the received octet in order to avoid losing any information. The first inputs, on the left side in FIG. 5, of the multiplexers $150_1$ to $150_8$ are connected to the wires of bus 143 respectively carrying the octet bits $b_1$ to $b_8$. The second inputs of the multiplexer $150_1$ and the multiplexers $150_2$ to $150_3$ receive the bit $b_8$ of the output bus 152 from the register OR1 and the bits $b_1$ to $b_7$ of the bus 143. The third inputs of the multiplexers $150_1$ and $150_2$ and the multiplexers $150_3$ to $150_8$ receive the bits $b_7$ and $b_8$ of the bus 152 and the bits $b_1$ to $b_6$ of the bus 143. The fourth inputs of the multiplexers $150_1$ to $150_3$ and the multiplexers $150_4$ to $150_8$ receive the bits $b_6$ to $b_8$ of the bus 152 and the bits $b_1$ to $b_5$ of the bus 143.

The selection of same-rank inputs, counting from 1 to 4 starting from the left in FIG. 5, of the multiplexers $150_1$ to $150_8$, is obtained by addressing using the shift word as1 as0 in the bus 145. Thus, for example, when a filling zero is to be extracted (bits (as1)(as0)=01), the second inputs receiving the bit $b_8$ from the bus 152 and the bits $b_1$ to $b_7$ from the bus 143 are selected by the multiplexers $150_1$ to $150_8$; and when two filling zeros are to be extracted (bits (as1)(as0)=10), the third inputs of the multiplexer $150_1$ to $150_8$ receiving the bits $b_7$ and $b_8$ from the bus 152 and the bits $b_1$ to $b_6$ from the bus 143 are selected. The eight, seven or six bits of the received octet without the filling zeros in the bus 143 and the most significant bit positions (bits (as1)(as0)=00) or the two most significant bits (bits (as1)(as0)=10) of the previously received octet in the bus 152 are respectively arranged in the most significant bit positions and the least significant bit positions in the 8-wire output bus 151 of the multiplexers $150_1$ to $150_8$ and are written in the memory RAM1. The octet is read 125 $\mu$s later in the memory RAM1 and is fed via the output register OR1 and the 8-wire bus 152 to the inputs of another array of eight multiplexers $160_1$ to $160_8$ of an octet aligning circuit 16 to obtain a suitably aligned octet, as described later.

To realign the octets in an HDLC frame, the flag or flags preceding the frame must also be detected in order to refer the realignment to the initial flag. The flag detection operation is performed by the memory PROM 1b associated with the memory PROM 1a. An output wire 146 supplies a "Flag" bit in the zero state when no flag is detected in the received octet and the previous octet. On the other hand, no filling zeros are to be extracted if Flag is equal to "1" when the previous octet is a flag and (add Shift) together with (as0) and (as1) are zero. However, Flag and add Shift can both be equal to one. This is so, for example, when the previously received octet is "X0111111" and the received octet is "0111110X"; a flag is detected (Flag=1), a filling zero is extracted (bits (as1)(as0)=01) from the position $b_7$ of the received octet which is then retransmitted 125 $\mu$s later with the two least significant bits of the received octet at that particular time. The memory PROM 1b further detects all the sequences containing more than six contiguous bits "1", which is indicated by an error bit E0 being coupled to output wire 147 of the memory PROM 1b. When a flag is detected with no zero extraction (Flag=1 and add Shift=0), the memory PROM 1b delivers to bus 148 a 3-bit word da2, da1, da0 that represents dealignment of the received flag. The word da2, da1, da0 is indicated below in Table I in terms of the received octet under process and the previously received octet.

TABLE I

| da2 | da1 | da0 | previously received octet | | | | | | | | received octet being processed | | | | | | | |
|---|---|---|---|---|---|---|---|---|---|---|---|---|---|---|---|---|---|---|
| 0 | 0 | 0 | X | X | X | X | X | X | X | 0 | 1 | 1 | 1 | 1 | 1 | 1 | 1 | 0 |
| 0 | 0 | 1 | X | X | X | X | X | X | 0 | 1 | 1 | 1 | 1 | 1 | 1 | 1 | 0 | X |
| 0 | 1 | 0 | X | X | X | X | X | 0 | 1 | 1 | 1 | 1 | 1 | 1 | 0 | X | X |
| 0 | 1 | 1 | X | X | X | X | 0 | 1 | 1 | 1 | 1 | 1 | 1 | 0 | X | X | X |
| 1 | 0 | 0 | X | X | X | 0 | 1 | 1 | 1 | 1 | 1 | 1 | 0 | X | X | X | X |
| 1 | 0 | 1 | X | X | 0 | 1 | 1 | 1 | 1 | 1 | 1 | 0 | X | X | X | X | X |

TABLE I-continued

| da2 | da1 | da0 | previously received octet | | | | | | | | received octet being processed | | | | | | | |
|---|---|---|---|---|---|---|---|---|---|---|---|---|---|---|---|---|---|---|
| 1 | 1 | 0 | X | X | 0 | 1 | 1 | 1 | 1 | 1 | 1 | 0 | X | X | X | X | X | X |
| 1 | 1 | 1 | X | 0 | 1 | 1 | 1 | 1 | 1 | 1 | 0 | X | X | X | X | X | X | X |
| 0 | 0 | 0 | 0 | 1 | 1 | 1 | 1 | 1 | 1 | 0 | X | X | X | X | X | X | X | X |

When a frame octet (Flag=0) is received, the alignment word da2, da1, da0 is such that da2=0 and bits (da1)(da0)=(as2) (as1); this is so when one or two filling zeros are to be extracted (add Shift=1 and bits (as0-)(as1)≠00) and when a flag has been detected (Flag=1).

An alignment calculating circuit 17 calculates the frame alignment. The circuit 17 is composed of a programmable memory PROM3 that receives add Shift, Flag and da2, da0 from the memory PROM 1b via the wires 144 and 146 and the bus 148. Circuit 17 is also supplied with a word ia2 ia1 ia0 from a memory RAM3 via an associated output register OR3 and a bus 170. The memory PROM3 resets alignment in response to the flags detected by memory PROM 1b and in response to certain detected errors. All of these indications are stored in a corresponding cell of the memory RAM3 such that the indications can be used for aligning the next octet 125 μs later. The word ia2, ia1, ia0 is representative of the previously recorded or "initial" alignment. When a flag is detected with no zero extraction, which is indicated by add Shift=0 and Flag=i, the memory PROM3 compares the word da2, da1, da0 with the word ia2, ia1, ia0. If these two words differ, the memory PROM3 supplies an error bit E1 to an output bus 171 thence to the memory RAM3; bit 61 indicates an error in the information alignment and that a new alignment word ia2' ia1' ia0' is part of an octet being processed such that:

ia2' ia1' ia0'=da2 da1 da0.

If no flag is detected or if a zero extraction is performed at the same time, i.e., Flag=0 and add Shift=0 or 1, the memory PROM3 carries out the following addition:

ia2 ia1 ia0+da2 da1 da0=r ia2' ia1' ia0'.

Memory PROM3 also writes the result of the addition into the memory RAM3. In the addition result, the bit r in state "1" means that the shift is greater than seven, which causes the octet counter to be blocked and an octet to be duplicated as seen later. The bit is supplied to the switching unit via a wire of a bus 171 to prevent the octet from being written normally and to control the octet writing 125 μs later when the octet is repeated.

Multiplexers $160_1$ to $160_8$ are included in circuit 16 for aligning the octet having bits, generally speaking, that are partly the least significant bits of the octet being processed and carried in the output bus 143 from the memory PROM 1a and partly the most significant bits of the octet written 125 μs earlier in the memory RAM1. Each of multiplexers $160_1$ to $160_8$ has eight inputs; the inputs of the same rank, counted from 1 to 8 (starting from the right hand in FIG. 5) are addressed by the alignment word ia2 ia1 ia0. The alignment word ia2 ia1 ia0 represents, in binary code, said rank less one and alignment word ia2 ia1 ia0 is calculated at time (t−125 μs) by the memory PROM3 and is supplied to register OR3 via a bus 170 at time (t). To obviate any information loss whatever, when ia=0, the octet transmitted by an 8-wire output bus 161 from the multiplexers $160_1$ to $160_8$ is the octet previously written in the memory RAM1.

Output bits $b_1$ to $b_8$, respectively derived from multiplexers $160_1$ to $160_8$, are the realigned octet without the filling zeros. The first inputs, illustrated on the right side of FIG. 5, of the multiplexers $160_1$ to $160_8$ are respectively connected to the wires $b_1$ to $b_8$ of the output bus 152 from the register OR1. The second inputs of multiplexers $160_1$ to $160_8$ are connected to the wires $b_2$ to $b_8$ of the bus 152 and to the least significant bit wire $b_1$ from the bus 143; the third inputs of multiplexers $160_1$ to $160_8$ are connected to the wires $b_3$ to $b_8$ of the bus 152 and to the wires $b_1$ and $b_2$ of the bus 143 and so on up to the eighth inputs of multiplexers $160_1$ to $160_8$ that are connected to the wire $b_8$ of the bus 152 and to wires $b_1$ to $b_7$ of the bus 143. By way of an example, Table II below includes details of the various operations carried out in the block diagram in FIG. 5 for aligning the octets of a 64 kbit/s channel IT.

As already mentioned, the memory PROM3 derives indications which are necessary for processing the HDLC frames at the switching unit level. The indications are stored in the memory RAM3 and derived again 125 μs later via register OR3 and a 5-wire bus 172. The indications include:

a bit DIZ which in state "1" indicates the absence of shift (da2=da1=da0=0) and which in state "0" indicates that shift must be carried out 125 μs later;

an error bit E1, supplied to an output wire in the bus 171 by memory PROM3; when E1=1 an error in the alignment of the received octets is indicated, e.g., corresponding to two received flags having a common zero: 0111111101111110; in other words, the bit E1 permits variable alignment ia between two frames, whereas such alignment should be constant since each flag occupies exactly the length of an octet;

a bit Flag 0, which in state "1" indicates the detection of a flag in the previously received octet;

TABLE II

| received octet (140) $b_8 b_1$ | "1" bits at the end of the octet | | Flag (146) | Add. Shift (144) | da1 da2 da0 (148) | ia2 ia1 ia0 (170) | ia2' ia1' ia0' (171) | octet (143) $b_8 b_1$ | octet (152) $b_8 b_1$ | octet (151) $b_8 b_1$ | realigned octet (161) $b_8 b_1$ |
|---|---|---|---|---|---|---|---|---|---|---|---|
| | old (142) | new (141) | | | | | | | | | |
| 01111110 | 000 | 000 | 1 | 0 | 000 | 000 | 000 | 01111110 | XXXXXXXX | 01111110 | = octet 152 |
| 11011111 | 000 | 010 | 0 | 1 | 001 | 000 | 001 | 01111111 | 01111110 | 11111110 | 01111110 |
| 11110111 | 010 | 100 | 0 | 1 | 001 | 001 | 010 | 01111111 | 11111110 | 11111111 | 11111111 |
| 01111101 | 100 | 000 | 0 | 1 | 010 | 010 | 100 | 00111111 | 11111111 | 11111111 | 11111111 |
| 01011111 | 000 | 000 | 0 | 1 | 001 | 100 | 101 | 00111111 | 11111111 | 01111111 | 11111111 |

TABLE II-continued

| received octet (140) $b_8 b_1$ | "1" bits at the end of the octet old (142) | "1" bits at the end of the octet new (141) | Flag (146) | Add. Shift (144) | da1 da2 da0 (148) | ia2 ia1 ia0 (170) | ia2' ia1' ia0' (171) | octet (143) $b_8 b_1$ | octet (152) $b_8 b_1$ | octet (151) $b_8 b_1$ | realigned octet (161) $b_8 b_1$ |
|---|---|---|---|---|---|---|---|---|---|---|---|
| 10111110 | 000 | 001 | 0 | 1 | 001 | 101 | 110 | 01111110 | 01111111 | 11111100 | 11110011 |
| 11001111 | 001 | 010 | 0 | 1 | 001 | 110 | 111 | 01101111 | 11111100 | 11011111 | 10111111 |
| 11110111 | 010 | 100 | 0 | 1 | 001 | 111 | r = 1,000 | 01111111 | 11011111 | 11111111 | 11111111 + r = 1 |
| 00111101 | 100 | 000 | 0 | 1 | 001 | 000 | 001 | 00011111 | 11111111 | 00111111 | 11111111 |
| 01010000 | 000 | 000 | 0 | 0 | 000 | 001 | 001 | 01010000 | 00111111 | 01010000 | 00011111 |
| ... | ... | ... | ... | ... | ... | ... | ... | ... | ... | ... | ... |
| ... | | | | | | | | | | | |
| 11111100 | 000 | 110 | 0 | 0 | 000 | 001 | 001 | 11111100 | XXXXXXXX | 11111100 | 0XXXXXXX |
| 11111100 | 110 | 110 | 1 | 0 | 001 | 001 | 001 | 11111100 | 11111100 | 11111100 | 01111110 |
| 10111110 | 110 | 001 | 1 | 1 | 001 | 001 | 010 | 01111110 | 11111100 | 11111101 | 01111110 |
| 01000000 | 001 | 000 | 0 | 0 | 000 | 010 | 010 | 01000000 | 11111101 | 01000000 | 00111111 |
| ... | ... | ... | ... | ... | ... | ... | ... | ... | ... | ... | XX010000 |

TABLE III

| received octet (140) $b_8 b_1$ | "1" bits at the end of the octet old (142) | "1" bits at the end of the octet new (141) | Flag (146) | Add. Shift (144) | da1 da2 da0 (148) | ia2 ia1 ia0 (170) | ia2' ia1' ia0' (171) | octet (143) $b_8 b_1$ | octet (152) $b_8 b_1$ | octet (151) $b_8 b_1$ | realigned octet (161) $b_8 b_1$ |
|---|---|---|---|---|---|---|---|---|---|---|---|
| 11100111 | 011 | 011 | 1 | 0 | 100 | 100 | 100 | 11100111 | 11100111 | 11100111 | 01111110 |
| 00111111 | 011 | 000 error here or more than 6 contiguous bits "1" | 0 | 0 | 000 | 100 | 100 | 00111111 | 11100111 | 00111111 | error + 11111110 |
| 00111111 | 000 | 000 | 1 | 0 | 111 | 100 | 111 + resetting error | 00111111 | 00111111 | 00111111 | 01111110 |
| ... | ... | ... | ... | ... | ... | ... | ... | ... | ... | ... | ... |
| 11111110 | XXX | 111 + error | 0 | 0 | 000 | XXX | XXX | 11111110 | XXXXXXXX | 11111110 | depends on ia2, ia1, ia0 |
| 11100111 | 011 | 011 | 1 | 0 | 100 | 101 | 100 + resetting error | 11100111 | 1110XXXX | 1110XXXX | 01111110 |

TABLE IV

| received octet (140) $b_8 b_1$ | "1" bits at the end of the octet old (142) | "1" bits at the end of the octet new (141) | Flag (146) | Add. Shift (144) | da1 da2 da0 (148) | ia2 ia1 ia0 (170) | ia2' ia1' ia0' (171) | octet (143) $b_8 b_1$ | octet (152) $b_8 b_1$ | octet (151) $b_8 b_1$ | realigned octet (161) $b_8 b_1$ |
|---|---|---|---|---|---|---|---|---|---|---|---|
| 10111110 | 101 | 001 | 0 | 1 | 010 | 111 | r = 1,001 | 00111111 | 11111XXX | 11111111 | r = 1 and 01111111 erroneous but octet not taken into account (because r = 1) |
| 01010011 | 001 | 000 | 0 | 0 | 000 | 001 | 001 | 01010011 | 11111111 | 01010011 | 11111111 |
| 00010000 | 000 | 000 | 0 | 0 | 000 | 001 | 001 | 00010000 | 01010011 | 00010000 | 00101001 |

According to Table IV, it appears that the only case the word transmitted toward the switching unit is erroneous, is when ia = 7; ia' = 7; ia' = 7 + 2 = 1 modulo 8. One bit is therefore missing to make up one complete octet; this bit is obtained from the next processing operation and transmitted when r ≠ 1.

the remainder bit r, already mentioned, supplied to a wire in the output bus 171 by memory PROM3; r=1 when ia' changes from 6 to 8, 7 to 9 or 7 to 8 by extraction of seventh and eighth zeros, eight and ninth zeros or an eighth zero respectively in the cases where one or two zeros are to be extracted from the received octet; the bit r obviates any duplication of a received octet in the switching unit;

the bit E0 which is fed by PROM 1b to the memory RAM3; E0=1 indicates an error, such as the transmission of more than six contiguous "1" bits.

An octet counting circuit 18 shown in FIG. 5 receives the bit r on the bus 171, the bits DIZ and Flag 0 on the bus 172 and the Flag bit on the wire 146; the Flag bit indicates the detection of a flag for the process in progress. The circuit 18 comprises a memory PROM4 for detecting the start and the end of the HDLC frames and counting the octet solely in the frames, including the two octets in the FCS sequence, a memory RAM4 for storing the 6-bit count $0_0$ to $0_5$ of octets supplied by the output bus 180 of memory PROM4 for each 64 kbit/s channel IT, and an output register OR4 associated with the memory RAM4 for supplying the count stored 125 μs earlier to the input of memory PROM4 via a 6-wire bus 181. The opening flag of a frame is detected by the memory PROM4 when $\overline{Flag}\cdot Flag\ 0 = 1$. Then for each frame octet, the memory PROM4 counter is incremented by one, except in the case where at least eight filling zeros have been extracted (r=1), whereupon the count is momentarily blocked for the octet being processed. The closing flag of a frame is indicated by $Flag\cdot\overline{Flag\ 0} = 1$. Then until the next frame are transmitted, as indicated by $Flag\cdot Flag\ 0 = 1$, and the count is unchanged. The blockage of the count $0_0$ to $0_5$ implies recopying the count in the corresponding cell of the memory RAM4. The case of DIZ=1 and r=1 is impossible since for DIZ=0 (ia 0), ia+da is never greater than or equal to 8, as the number of zeros to be extracted per octet is never greater than 2; the case of DIZ=0 and r=1 is also impossible when the received octet corresponds to the end of a frame (Flag=1 and Flag=0) or to the interval between two frames ($\overline{Flag}\cdot\overline{Flag\ 0}=1$). Table V below summarizes the various foregoing operations performed by the memory PROM4.

TABLE V

| Flag | 0 | 0 | 1 | 1 | 0 | 0 | 0 | 1 | 0 | 0 | 1 | 1 |
|---|---|---|---|---|---|---|---|---|---|---|---|---|
| Flag 0 | 1 | 0 | 0 | 1 | 1 | 0 | 0 | 1 | 1 | 0 | 0 | 1 |
| DIZ | 0 | 0 | 0 | 0 | 1 | 1 | 1 | 1 | 0 | 0 | 0 | 0 |
| r | 0 | 0 | 0 | 0 | 0 | 0 | 0 | 0 | 1 | 1 | 1 | 1 |
| Operation performed on count $0_0$ to $0_5$ | S1 | IN | B | B | RZ | IN | IN | B | RZ | B | IM | IM |

In Table V, IN, S1, RZ and B represent incrementation by one, setting to one, resetting to zero and blockage of octet count $0_0$ to $0_5$ respectively; further IM indicates an impossible combination of Flag, Flag 0, DIZ and r.

Figure 6:
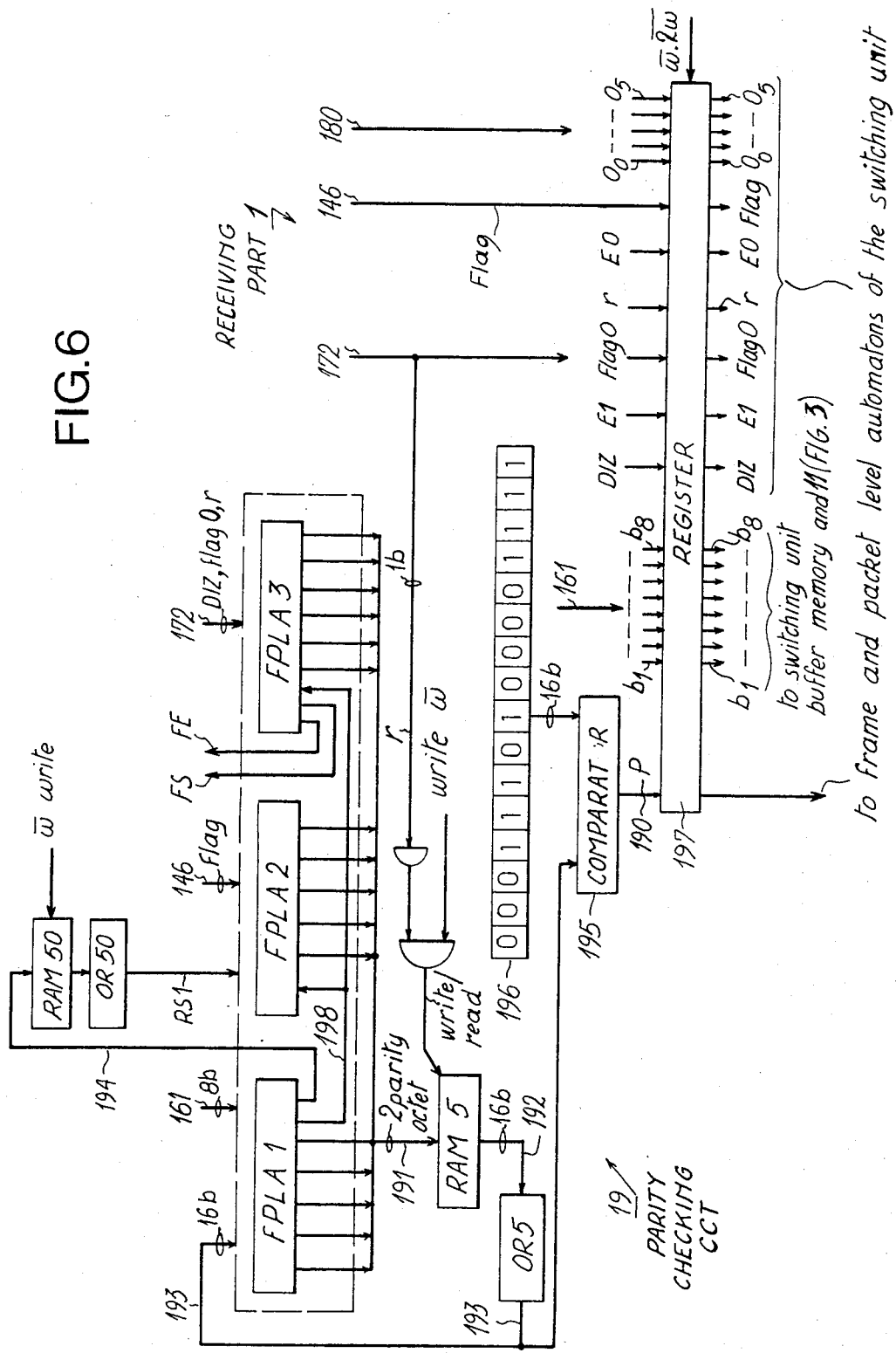
FIG. 6 is a detailed block diagram of the parity checking circuit included in the receiving part.

FIG. 6 is a detailed block diagram of a parity checking circuit 19 included in the receiving part 1. The purpose of the circuit 19 is to reproduce the frame checking sequence in order to validate each received frame. The frame validity is indicated by a parity bit P being in state "1"; bit P is derived by the output register in the circuit 19.

The circuit 19 is also based on structure as depicted in FIG. 3. An input combination logic unit in the circuit 19 comprises three field programmable logic arrays FPLA1 to FPLA3, a memory RAM5 responsive, via a bus 191, to two parity octets calculated by the arrays FPLA1 to FPLA3, and an output register OR5. The 16 parity bits in the particular channel IT are transmitted by an output bus 192 from the memory RAM5 to the register OR5 which feeds the parity bits back to inputs of the arrays FPLA1 to FPLA3 via a bus 193. The logic arrays FPLA1 to FPLA3 also receive the realigned octets without the filling zeros via the bus 161; in particular the Flag bit is coupled to the logic arrays via the wire 146, while bits DIZ and r and Flag0 bits are supplied to the logic arrays via the bus 172. A bit RS1 is supplied by logic array FPLA1 via a bus 194 to a memory RAM 50, associated with an output register OR 50 which, at the start of a frame, supplies the bit RS1 125 μs later to the arrays FPLA1 to FPLA3 to reset the bits in the two parity octets to "1". A bus 198 retransmits the partial sums calculated in the first array FPLA1 to logic arrays FPLA2 and FPLA3. The third array FPLA3 derives two bits FS and FE that respectively indicate the start and end of each frame in terms of the Flag, Flag0 and DIZ bits.

The FCS sequence is calculated as a function of the two parity octets stored 125 μs earlier by the memory RAM5 and as a function of the octet presently being processed and received via the bus 161. At the start of the frame (FS=1), the bits of the two parity octets stored in the memory RAM5 are all set to "1" by the signal RS1. For each frame octet in the channel IT in question, transmitted via the bus 161, the arrays FPLA1 to FPLA3 carry out an operation on 8 bits in parallel; the operation is equivalent to dividing the octet bit by bit by a generator polynomial $x^{16}+x^{12}+x^5+1$ that is obtained from the two parity octets. At end of a frame, during reception of the second FCS sequence octet, the two parity octets must be equal to the remainder 0001110100001111. Frame validity is ensured in the circuit 19 by a comparator 195 which, for each octet, receives the two parity octets stored in the memory RAM5, via the associated output register OR5 and the bus 193; the comparator also responds to the remainder stored in a read-only memory 196. The frame is considered valid when, at the end of the frame (FE=1), the two compared octet pairs are identical, which gives rise to bit P being in state "1", as derived from output 190 of the comparator 195. In the case of the so-called remainder bit r being equal to "1", which corresponds to blockage of the octet transmission or inability to transmit the octet, writing of data into the memory RAM5 is blocked by the bit r in the bus 172, whereby the contents of the corresponding cell of memory RAM5 remain unchanged.

For each octet processed in the receiving part 1, the following indications are stored in parallel in an output buffer register 197: the parity bit P via the wire 190, the eight bits of the realigned octet via the bus 161, the bits DIZ, E1, Flag 0, r and E0 via the bus 172, (the bits E0, r and E1 can be supplied directly by the wire 147 and the bus 171 (FIG. 5) to the register 197 so they are not stored in the memory RAM3) the Flag bit via the wire 146 and the six bits $0_0$ to $0_5$ of the octet via the bus 180. The realigned octet in the bus 161 is applied via the register 197 and the output multiplex 11 (FIG. 2) to the switching unit buffer memory, whereas the other indication elements are transmitted to the switching unit automatons for frame management at the packet level.

Figure 7A:
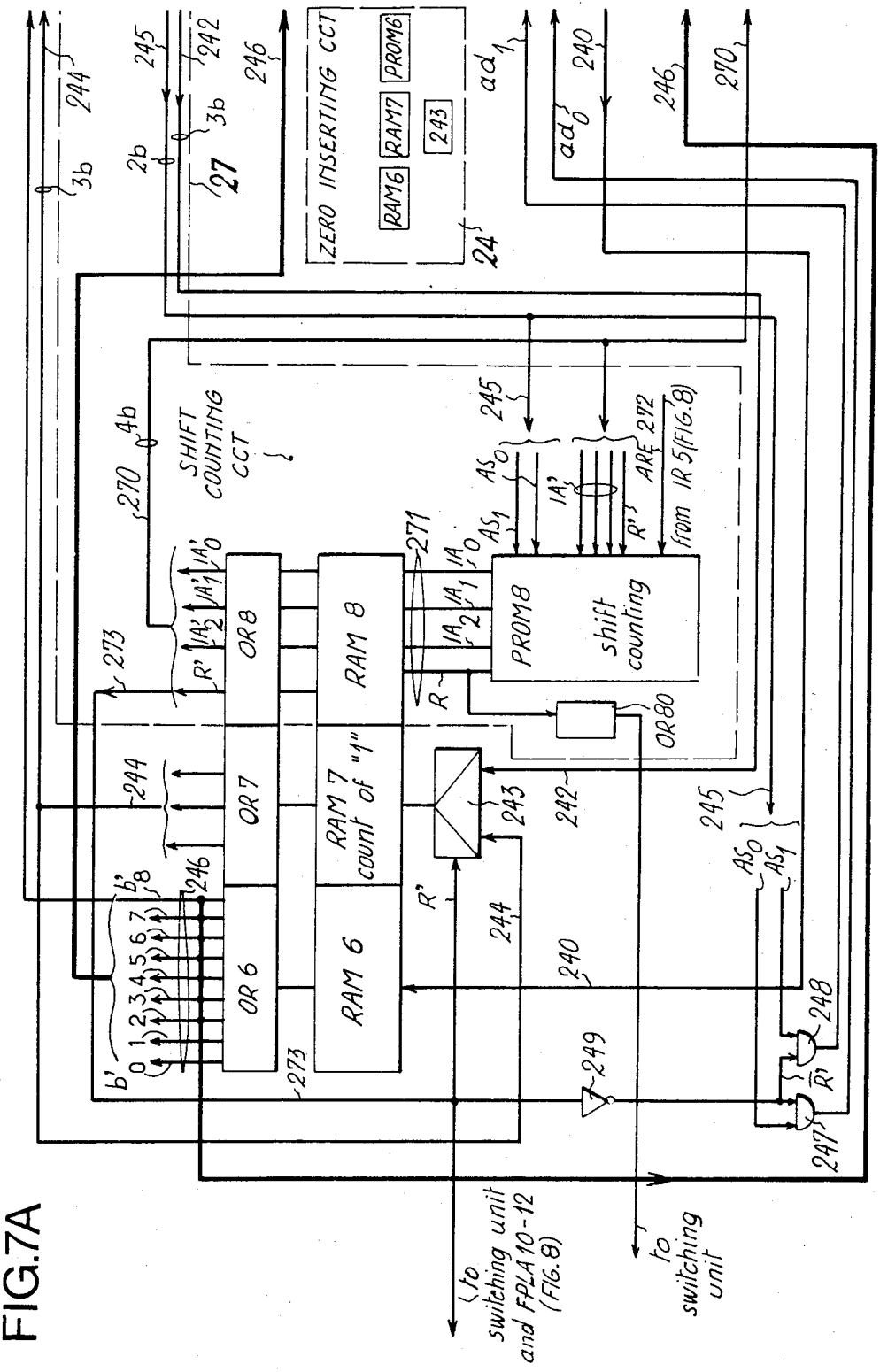
FIGS. 7A and 7B, together, constitute a detailed block diagram of the filling zero inserting means included in the coupler transmitting part.
Figure 7B:
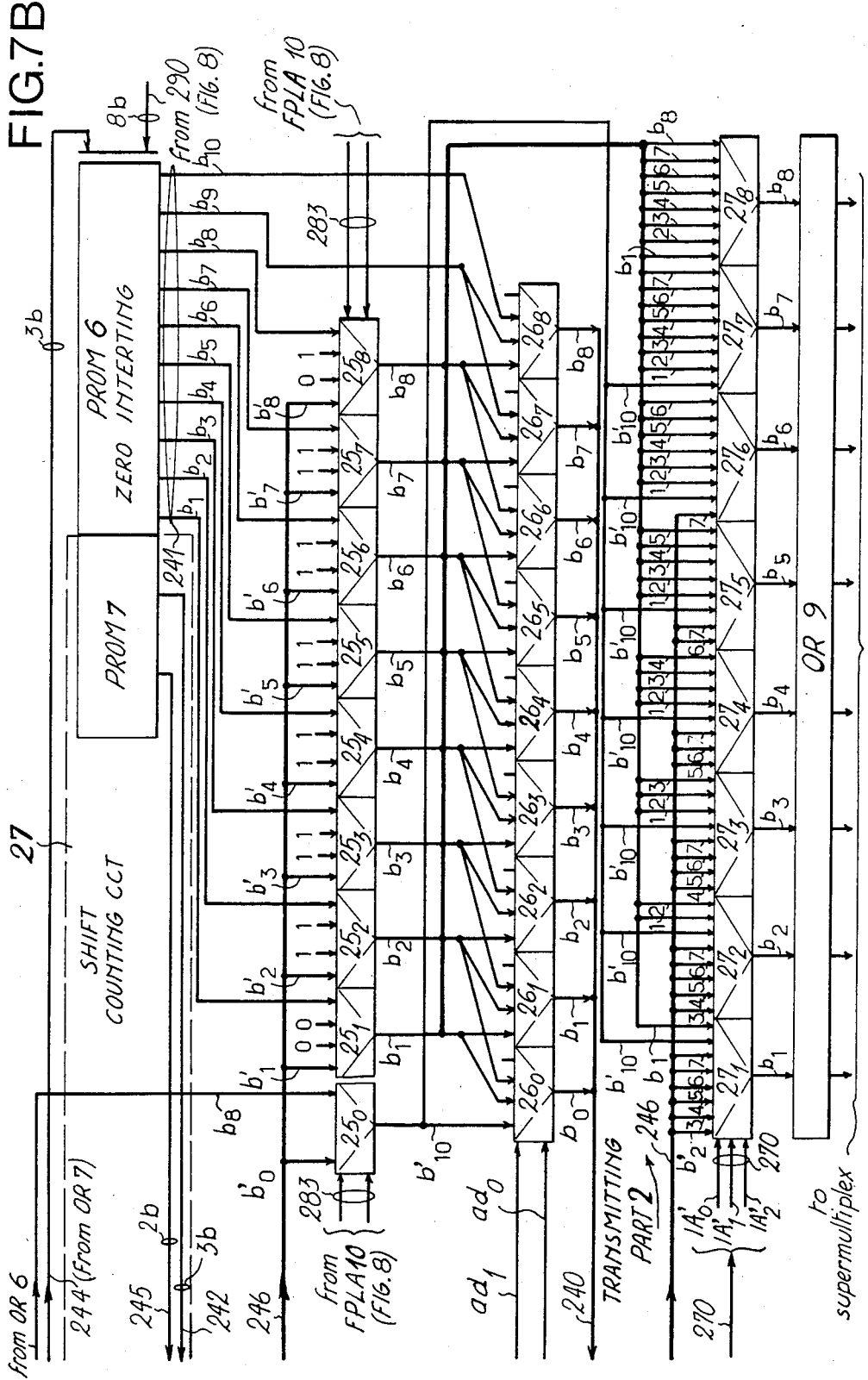

Reference is now made to FIGS. 7 and 8, together forming a block diagram of the HDLC coupler transmitting part 2. FIG. 7 includes FIGS. 7A and 7B, such that FIG. 7A should be positioned to the left side of FIG. 7B. In the transmitting part, an input register IR5 (FIG. 8) receives the frame octets from the switching unit buffer memory, with the exception of the two FCS sequence octets. Register IR5 also receives, from the switching unit automaton memories, a 6-bit word Nb indicating the exact number of octets in the frame less the two FCS octets, together with a bit INIT which initiates the start of frame transmission, a bit Bl for blocking incrementation of the transmitted octet count and, where applicable, a bit ARE representative of octet alignment reinitiation or clearing. The octet for each 64 kbit/s channel IT, or one of the two FCS octets, as seen hereinafter, is quickly transmitted through a multiplex 290 to a memory PROM6 of a filling zero inserting circuit 24 (FIG. 7B).

In reference to FIGS. 7A and 7B, the circuit 24 comprises a memory RAM6 having a 9-wire input bus 240 connected to a 10-wire output bus 241 of memory PROM6 through two arrays, each including nine multiplexers $25_0$ to $25_8$ and $26_0$ to $26_8$. Another memory PROM7 cooperating with the memory PROM6, where the two memories PROM6 and PROM7 play a reciprocal rôle to that of memories PROM $1a$ and PROM $1b$ in the receiving part 1 (FIG. 5), transmits to a memory RAM7 via output bus 242 and multiplexer 243 the number of "1" bits at the end of the received octet after filling zero insertion, i.e., at the end of a 10-bit word on the bus 241. The number of "1" bits at the end of the preceding octet is read-out from memory RAM7 and delivered from an associated output register OR7 via a bus 244 to the memories PROM6 and PROM7 such that the two memories insert a filling zero for each detected output with five contiguous bits "1". The number as1 as0 of inserted filling zeros less than or equal to two is supplied across a two-wire bus 245 by the memory PROM7 to a memory PROM8 (or FPLA array) in a shift counting circuit 27.

The circuit 27 plays a reciprocal rôle to that played by the alignment calculating circuit 17 in the receiving part (FIG. 5). The circuit 27 also comprises a memory RAM8 and an associated 4-bit output register OR8. For each octet, the memory PROM8 calculates an alignment word $r$ $ia2'$ $ia1'$ $ia0'$ stored in the memory RAM8 125 $\mu s$ earlier and supplied to output bus 270 by the register OR8. The alignment word thus calculated is supplied by the memory PROM8 and is stored in RAM8 via a 4-wire bus 271. The remainder bit r derived from the memory PROM8 is stored in an output register OR 80 that transmits the bit r to the upper level in the switching unit under the instigation of the signal $\omega$, $2\omega$ so that the switching unit does not supply an octet to the following processing operation of the channel IT, 125 $\mu s$ later. The memory PROM8, when applicable, receives the alignment reinitiation bit ARE from the register IR5 (FIG. 8) via a wire 272.

Furthermore, another input bus 244 of the multiplexer 243 receives the old number of "1" bits at the end of the previous octet from the register OR7. The signal on one of buses 242 and 244 is selected in the multiplexer 243 and is stored in the memory RAM7 in terms of the state of the bit r' which was stored 125 $\mu s$ earlier in the memory RAM8 and which is carried by a wire 273 in the bus 270.

In the first array of multiplexers $25_0$ to $25_8$, each multiplexer has four inputs that are selected by two signals in a bus 283; a description of how the two signals are obtained is given later in reference to FIG. 8. The first inputs, illustrated on the left side of FIG. 7B, of the multiplexers $25_0$ to $25_8$ are connected to the nine wires in the output bus 246 of output register OR6 associated with the memory RAM6 and correspond to the nine previously stored bits $b_0$ to $b_8$; the second inputs of the multiplexers $25_1$ to $25_8$ are respectively permanently in the corresponding states of the bits 01111110 of a flag; the third inputs of the multiplexers $25_1$ to $25_8$ are respectively permanently in the states 01111111 and are selected when the corresponding channel IT is in the frame abortion state, in accordance with paragraphs 2.2.10 and 2.2.12.2 of aforesaid Recommendation X.25; the four inputs, illustrated on the right side of FIG. 7B, of the multiplexers $25_0$ to $25_8$ are respectively connected to: (a) the wire in the output bus 246 of register OR6 that derives the previously stored most significant bit $b_8$, which is the bit $b_9$ in the previous octet on bus 241 when only one filling zero has been inserted or which is bit $b_{10}$ in the previous octet in the bus 241 when two filling zeros have been inserted, and (b) the wires of output bus 241 of the memory PROM6 on which are derived the first eight bits $b_1$ to $b_8$ of the octet, that may include filling zeros.

Each of multiplexers $26_0$ to $26_8$ of the second array also includes four inputs that are selected by two signals and $ad_0$ and $ad_1$. AND gates 247 and 248 (FIG. 7A) respond to bit $r'$ from the register OR8, via the wire 273 and an inverter 249, and to bits as0 and as1 on bus 245 to derive signals $ad_0$ and $ad_1$ in accordance with:

$$ad_1 = \overline{r'} \times as0 \text{ and } ad_1 = \overline{r'} \times as1$$

The 9-wire output bus of the multiplexers $26_0$ to $26_8$ is connected to the input bus 240 of the memory RAM6. While $r'=0$, i.e., so long as no more than seven filling zeros have been inserted with respect to the last received bit ARE=1 or with respect to the last remainder $r=1$, the first inputs of the multiplexers $26_0$ to $26_8$ are selected and supply the memory RAM6 with the bit $b'_{10}$ derived from multiplexer $25_0$ and the bits $b_1$ to $b_8$ derived from multiplexers $25_1$ to $25_8$ when no filling zero is inserted (as1 as0=00); the second inputs of the multiplexers $26_0$ to $26_8$ are selected and supply memory RAM6 with the bits $b_1$ to $b_9$ of the octet being processed when one filling zero is inserted (as1 as0=1), the bits $b_1$ to $b_8$ being derived by the multiplexers $25_1$ to $25_8$ and the bit $b_9$ being supplied to a wire in the bus 241 by memory PROM6; if two filling zeros have been inserted (as1 as0=10), the third inputs of the multiplexers $26_0$ to $26_8$ are selected and cause memory RAM6 to be supplied with bits $b_2$ to $b_8$ of the octet under process, as supplied by multiplexers $25_2$ to $25_8$ and the two most significant bits $b_9$ and $b_{10}$ derived from the memory PROM6 on the two leads of bus 241, illustrated on the right side of FIG. 7B. If $r'=1$, the number of filling zeros was greater than eight for the previous processing operation and bit r has been supplied by the register OR 80 to the switching unit, which 125 $\mu s$ later does not transmit eight frame bits to the register IR5 (FIG. 8). The bit r is stored in the channel IT context at the level of the switching unit which blocks the transmission of an octet from the buffer memory in order for the octet of the channel IT corresponding to the eight or nine remaining bits stored in the memory RAM6 to be transmitted; in this case, the eight least significant bits that are transmitted, together with the high rank bit which has been stored beforehand, are loaded into the memory RAM6 through the multiplexers $25_0$ to $25_8$ and $26_0$ to $26_8$, and the previously stored number of bits "1" at the end of the octet is re-written in the memory RAM7 as a result of multiplexer 243 having selected the bus 244.

Thus, the multiplexers $26_0$ to $26_8$ play a rôle reciprocal to that played by multiplexers $150_1$ to $150_8$ in the receiving part and insert the filling zeros. The multiplexers $25_0$ to $25_8$ select nine old or new bits or, where applicable, select a flag or a frame octet or are blocked.

The transmitting part 2 comprises a third array of multiplexers $27_1$ to $27_8$ that play a reciprocal rôle with respect to the rôle that multiplexers $160_1$ to $160_8$ play in the receiving part so as to extract frame octets with filling zeros eventually. An output bus of the multiplexers $160_1$ to $160_8$ is connected to an output register OR9 for transmitting the unaligned octets, as the receiving part receives unaligned octets. Each mutliplexer $27_1$ to $27_8$ comprises eight inputs that are selected by the shift word ia2' ia1' ia0' on bus 270.

By way of an example, when no filling zero is inserted in the octet being processed (as1 as0=00; ia'=0 and r'=0), first inputs of the multiplexers $27_1$ to $27_8$, as illustrated on the right side of FIG. 7B, are connected to respond to the outputs of multiplexers $25_1$ to $25_8$; multiplexers $27_1$ to $27_8$ derive the octet $b_1$ to $b_8$ received by the memory PROM6. If one or two filling zeros are to be inserted in the next octet, the multiplexers $27_1$ to $27_8$, as before, transmit the bits $b_1$ to $b_8$; the bits $b_9$ or $b_9$ and $b_{10}$ are stored in the memory RAM6 via the bus 240 to enable them to be derived as least significant bits with the bits $b_1$ to $b_7$ or $b_1$ to $b_6$ of the next third octet.

For the next third octet, if two filling zeros have been inserted since the last remainder (r=1), which is represented by the word r'ia2' ia'1 ia'0≡ria2 ia1 ia0+as1 as0 modulo 8 equal to 0010, and if one filling zero is to be inserted (as1 as0=01), multiplexers $27_1$ to $27_8$ are supplied with: (a) second input bit b'7, as supplied by register OR6 to bus 246, (b) the bit $b'_{10}$, as derived from multiplexer $25_0$, and (c) the bits $b_1$ to $b_6$, as derived from multiplexers $25_1$ to $25_6$. Bit $b'_{10}$ is actually the previous bit b'8, which is in turn the tenth bit $b_{10}$ derivied by memory PROM6 and stored 125 μs earlier for the insertion of two filling zeros. The inputs of the multiplexers $27_1$ to $27_8$ are selected by the number ia'2 ia'1 ia'0 of zeros already inserted since the last remainder (r=1), or the last bit ARE=1, whereas the inputs of the multiplexers $26_0$ to $26_8$ are selected by the signals ad1 and ad0 dependent on r' and as1 as0 by means of the AND gates 247 and 248; for the previous example, the bit b'7, which is in fact $b_9$ with respect to the memory PROM6, and bit $b'_{10}$ are derived from the previous octet in the memory RAM6, and the bits $b_1$ to $b_6$ are derived from the memory PROM1 and coupled via the multiplexers $25_1$ to $25_6$ to multiplexers $26_1$ to $26_6$.

The octet shifts continue as before until six or seven filling zeros have been inserted; as an example, after seven filling zeros have been inserted, the seven inputs are selected by multiplexers $27_1$ to $27_8$, causing (a) bits b'2 to b'7 supplied by memory RAM6 to bus 246 to be coupled to register OR9, (b) bit $b'_{10}$ as derived by multiplexer $25_0$ to be coupled to register OR9, and (c) the bit $b_1$ supplied by multiplexer $25_1$ on bus 241 to be coupled to gate OR9.

The processing is carried out as above until the memory PROM8 derives a bit r in state "1"; the "1" state of bit r is stored in the memory RAM8 and supplied to switching unit via the register OR 80. Simultaneously, the memory PROM8 writes the word ia2 ia1 ia0=000 or 001 in memory RAM8. During the following processing operation 125 μs later, the register IR5 (FIG. 8) does not receive any octets $b_1$ to $b_8$ from the switching unit buffer memory, and the automatons of the switching unit supply ARE=1 to the memory PROM8 via the wire 272 so that r'=1 and ia'2 ia'1 ia'0=000 or 001 can be read-out from the memory RAM8. Thereby, the count of bits "1" can again be read from the memory RAM7 and again be written without any modification through the bus 244 and the multiplexer 243, where the bus 242 is not selected in the multiplexer 243 by the bit r=1. The memory PROM8 changes r'=1 into r=0, where r'=r=1 does not exist. The inputs $b'_1$ to b'8 of the multiplexers $25_1$ to $25_8$ are selected by signals on bus 283 whereas the input b'0 of the multiplexer $25_0$ is selected; this is in contrast with selection of bit b'8 under normal operation conditions. The bits as0 and as1 are blocked by gates 247 and 248 in response to derivation of bit r', thereby permitting coupling of bits b'0 to b'8 via multiplexers $26_0$ to $26_8$ and bus 240 to the write input of memory RAM6, which stores them. The bits b'1 to b'8 at the outputs of multiplexers $25_1$ to $25_8$ are coupled through multiplexers $27_1$ to $27_8$ when ia2 ia1 ia0=000. Alternatively, bits b'0 to b'7, at the outputs of the multiplexers $25_0$ to $25_7$, are coupled through multiplexers $27_1$ to $27_8$ when ia2 ia1 ia0=001, with bit b'8 being derived 125 μs later as bit $b'_{10}$ at the outputs of multiplexers $25_0$ and $27_1$.

As illustrated in FIG. 8, the transmitting part 2 comprises circuit 28 for deriving timing logic signal HT, $HT_0$ and $HT_1$ and for counting octets. The circuit 28 includes three memories RAM10, RAM11 and RAM12 respectively associated with a 3-bit output register OR 10 and two 6-bit output registers OR 11 and OR 12. Circuit 28 also includes field programmable logic arrays FPLA 10 and FPLA 12 (or memories PROM) which mutually cooperate.

The memories RAM 10 to 12 are cleared by the INIT signal that is derived from the switching unit and is in state "1" just before the derivation of a particular first octet of the channel IT frame, if the particular first octet differs from a flag. If HT=$HT_0$=HT=1, the HDLC coupler derives flags and supplies them to the second inputs of the multiplexers $25_1$ to $25_8$ (FIG. 7B). The bits HT, $HT_0$ and $HT_1$ are in state "0" throughout reception of the frame octets derived from the switching unit, except when the two FCS octets are derived. When INIT=1, the number, Nb, of frame octets is written in the memory RAM 11 via the input register IR5 and the octet count cell in the memory RAM 12 is set to zero. As each octet is derived from the switching unit, the array FPLA 12 compares the number of octets actually stored in the memory RAM 11 with the number of octets already stored in and derived from the memory RAM 12. The array FPLA 12 increments the octet count of memory RAM 12 by one by writing the new count into the memory RAM 12 via a 6-wire bus 280. The octet count is blocked when the array FPLA 12 receives, via the register IR5, the blockage bit Bl, which corresponds, for instance, to an idle channel, i.e., generally when the bit r' in the wire 273 (FIG. 7A) is in state "1". This indicates that an additional octet is being derived following the insertion of at least eight filling zeros. When the array FPLA 12 detects an equality in the numbers in the memories RAM 11 and RAM 12, which indicates transmission of the last octet generally in the frame information field, the array FPLA 12 blocks the octet count in the memory RAM 12. A signal corresponding to the last transmitted data octet LDO initiates calculation of the frame checking sequence in circuit 29.

For each channel IT, the memory RAM 10 stores the state of the three timing signals HT, $HT_0$ and $HT_1$ that are derived by the logic array FPLA 10. The signals depicted in FIG. 9 are obtained as a function of the states of: (a) signals HT, $HT_0$ and $HT_1$ stored 125 μs earlier and coupled by register OR 10 to output bus 281, (b) the signal r' on the lead 273 (FIG. 7A), (c) the signal LDO derived by the array FPLA 12 and the (d) signal INIT derived by the switching unit and coupled thence to register IR5. In a simple embodiment, the signals HT, $HT_0$ and $HT_1$ are the result of the following relationships:

$$HT = \overline{r_0} \cdot HT_0 \cdot HT_1 + HT \cdot \overline{INIT}$$

$$HT_0 = \overline{r} \cdot HT_0 \cdot LDO + HT_0 \cdot \overline{INIT} + HT_1 \cdot \overline{INIT}$$

$$HT_1 = \overline{r_0} \cdot HT_0 + HT_1 \cdot \overline{INIT}$$

The signals HT, $HT_0$ and $HT_1$ are written in the memory RAM 10 via the bus 282. Generally speaking, the signal HT is in state "1" for flag transmission, the signal $HT_0$ is in state "1" for the transmission of the FCS sequence and the flags, and the signal $HT_1$ is in state "1" for the transmission of the second octet in the FCS sequence and the flags. Signals HT, $HT_0$ and $HT_1$ are processed by the array FPLA 10 to derive other clock signals that are supplied via bus for the inputs of the multiplexers $25_0$ and $25_8$ (FIG. 7B). The clock signals on bus 283 also initiate calculation of the FCS sequence in the circuit 29 and transmission of the FCS sequence at the end of each frame.

The frame checking sequence calculating circuit 29 is illustrated in FIG. 8. The circuit 29 comprises, like the parity checking circuit 19 in the receiving part (FIG. 6), a memory RAM 13. A cell of memory RAM 13 associated with a 64 kbit/s channel IT stores the two parity octets. Circuit 29 also includes a 16-bit output register OR 13 and three field programmable logic arrays FPLA 13 to FPLA 15 that are organized in an analogous fashion to the arrays FPLA1 to FPLA3 shown in FIG. 6. The arrays FPLA 13 to FPLA 15 are responsive to the output of register IR5 to receive the data octets derived from the switching unit buffer memory. For each of the derived octets arrays FPLA 13 to FPLA 15 calculate the two parity octets as described in paragraph 2.2.7 in aforesaid Recommendation X.25. In response to the clock signals on output bus 283 of the array FPLA 10, the register OR 13 sequentially supplies the two FCS sequence octets at the end of the frame to the multiplexer 290 via bus 291. Then the demultiplexer 290 delivers to the memory PROM6 insignificant octets that are made up of eight contiguous zeros and that are replaced by flags in the multiplexers $25_1$ to $25_8$ (FIG. 7B).

What we claim is:

1. A coupler between a PCM channel bidirectional multiplex and a packet switching unit, the PCM channels carrying words with a predetermined number of bits and being multiplexed word by word, the PCM channels being multiplexed packet mode channels each carrying data word frames separated from each other by at least one flag and including filling bits having a first predetermined binary value such that said frame are without flags, said coupler comprising receiving means for extracting the filling bits from frames received from said multiplex and for supplying said received frames without said filling bits to said switching unit, and transmitting means for inserting said filling bits in transmitted frames derived by said switching unit and for supplying said transmitted frames with said filling bits to said multiplex, said receiving means and transmitting means each comprising: logic means for processing only one channel word at a time to derive at least one portion of said channel word, the derived channel word portion being in the form of a word, and memory means having as many memory cells as the number of said channels for storing the contents of each channel in the cells, said contents of a word being written into the memory means after a word in a channel has been processed by the logic means and read from the memory means at a time to enable the next word in said channel to be processed by the logic means after the other channels have been processed by the logic means, the writing and reading being at the rate of one word per channel.

2. The coupler of claim 1 wherein said logic processing means comprises at least one programmable means.

3. The coupler of claim 2 wherein the programmable means includes a read only memory and a field logic array.

4. The coupler of claim 1 wherein said receiving means comprises logic means for counting the number of binary bits having a second predetermined binary value at the end of each word in the received channels from said multiplex, the first and second values differing from each other, means for storing said number of bits having the second predetermined value for each word in each of said received channels, logic means for detecting the filling bits to be extracted from each word of each received channel from the multiplex in terms of the stored number of bits having the predetermined value for the previous word of the same channel, logic means for relegating the detected filling bits at the end of a word, logic means for extracting said detected filling bits in a word to replace said detected filling bits at the start of a word by the last bits of the previous word, means for storing a word from each channel with said extracted filling bits, logic means for counting the number of filling bits modulo said predetermined number of bits in each channel as the words in said channel are being received from said multiplex, means for storing said number of filling bits for each channel, and logic realigning means for transmitting to the switching unit a realigned word including, at the start of the realigned word, bits from the end of a stored word with extracted filling bits for each channel, and at the end of the realigned word, bits from the start of the next word of said channel having filling bits at the end, where the number of said start bits of said next word is equal to the stored number of filling bits of said channel after said word to be transmitted has been processed.

5. The coupler of claim 1 wherein said transmitting means comprises logic means for inserting filling bits in words derived from said switching unit, logic means for counting the number of bits having the second value at the end of each word derived from said filling bit inserting means, means for storing said number of bits having the second value for a word in each channel, logic means for counting the number of filling words to be inserted in a word derived from said switching unit in terms of the number of stored bits having the second value in the previous word of the same channel, logic means for forming a word with the start bits of said word with said filling bits, logic means for forming a word with the end bits of said word with said filling bits, means for storing the end bits of a word with the filling bits for each channel, logic means for counting the number of inserted filling bits modulo said predetermined number of bits in each channel as the words in said channel are being transmitted to said multiplex to maintain current the shift between the word to be transmitted in the multiplex and the word derived from said switching unit, means for storing said filling bit number for each channel, and logic dealigning means for transmitting in said multiplex a dealigned word including bits from the end of a stored previous word with filling bits for each channel and the bits from the start of the next word with filling bits of said channel, where the number of said end bits of the previous word is equal to the number of stored filling bits of said channel after said previous word has been processed.

6. The coupler of claim 4 wherein each frame carried by the multiplex ends with two frame checking sequence words obtained using a known algorithm, said coupler comprising logic means for calculating a pair of parity words using said algorithm based on a realigned word derived by said realigning means, means for storing said parity word pair of each channel to supply said parity word pair to said calculating means simultaneously with the transmission of the next word of said channel from said realigning means, and means for comparing each stored parity word pair with a predetermined word pair to transmit an enabling bit to said switching unit at the end of each received frame.

7. The coupler of claim 5 wherein each frame on the multiplex ends with two frame checking sequence words obtained using a known algorithm, said coupler comprising logic means for calculating a pair of parity words using said algorithm based on a word derived by said switching unit, means for storing said parity word pair of each channel to supply said parity word pair to said calculating means simultaneously with the transmission of the next word of said channel from said switching unit, and means for multiplexing each of said two parity words in each frame of each channel to supply said parity word to said filling bit inserting means after said switching unit has supplied the last word in said frame of said channel.

8. The coupler of claim 4 wherein said receiving means comprises logic means for counting the number of words per frame derived by said realigning means as the words are being received from said multiplex, and means for storing said number of words received per frame for each channel to apply said number to said counting means during reception of the next word of said channel.

9. The coupler of claim 5 wherein said transmitting means comprises means for storing the number of words contained in a frame of each channel, said frame word number being derived by said switching unit at the transmission start of said frame, means for storing the number of words supplied by said switching means to said filling bit inserting means for each frame of each channel, logic means for counting the number of words per frame of each channel supplied by said switching unit to writing said transmitted word number in said storing means, and logic means for comparing said stored number of words contained in a frame with said stored number of transmitted words of said frame for detecting the end of said frame in response to said two numbers being equal.

10. A coupler connected between a pulse code modulated multiplexed signal line and a packet circuit switching unit, the multiplexed signal having a first bit rate f and plural parallel channels at a second bit rate $f/(n_1)$ where $n_1$ is a first integer, the channels being divided into frames at a third bit rate $f/(n_1 \cdot n_2)$, where $n_2$ is a second integer, certain of the frames being high level data link packet frames, the high level data link packet frames including plural sequential words, each word including several sequential bits, the bits of the packet frame words being coded to represent addresses, control functions, information, and frame checking sequences, adjacent frames being separated by at least one flag representing word, the frames including filling bits having a predetermined value so that the frames contain no flag representing words, said coupler comprising:

receiving means responsive to the signal on the line for processing the signal supplied to the coupler and for coupling the processed signal to the coupler, transmitting means responsive to a signal derived from the coupler and for processing the signal derived from the coupler so it is a pulse code modulated signal having bit rate f with plural channels at bit rate $f/(n_1)$ divided into frames at bit rate $f/(n_1 \cdot n_2)$, the receiving means including means for extracting the filling bits from the signal supplied by the line to the coupler so the signal supplied by the coupler to the packet circuit switching unit has no filling bits, the transmitting means including means for inserting filling bits into the signal supplied by the packet circuit switching unit to the coupler so the frames in the signal supplied by the coupler to the line have no flag words therein, the transmitting and receiving means each including high level data link processing logic circuitry for sequentially processing only one word of a channel at a time, memory means exchanging signals with an operating synchronously with the processing logic circuitry of the transmitting and receiving means, the memory means having plural sequentially addressed cells for storing the bits of a packet mode channel so that the memory means is organized to store the data by channel addresses and by frame addresses in the channels, means for cyclically reading bits of successive packet mode channel words from the memory during first successive intervals, means for cyclically writing bits of successive packet mode channel words into the memory during successive second intervals, each of the second intervals occurring between a pair of adjacent ones of the first intervals.

11. The coupler of claim 10 wherein the processing means responds to words in the channel to modify words in the channel.

* * * * *